United States Patent [19]

Agrawal et al.

[11] Patent Number: 5,696,973
[45] Date of Patent: *Dec. 9, 1997

[54] INDEX-BASED METHOD FOR SUPPORTING MULTIMETHOD FUNCTION OVERLOADING WITH COMPILE-TIME TYPE CHECKING AND RUN-TIME DISPATCH

[75] Inventors: Rakesh Agrawal, San Jose; Linda Gail DeMichiel, Los Altos; Bruce Gilbert Lindsay, San Jose, all of Calif.

[73] Assignee: International Business Machines Corporation, Armonk, N.Y.

[*] Notice: The term of this patent shall not extend beyond the expiration date of Pat. No. 5,488,727.

[21] Appl. No.: 390,886

[22] Filed: Feb. 17, 1995

[51] Int. Cl.⁶ .................................................. G06F 9/45
[52] U.S. Cl. ....................................................... 395/709
[58] Field of Search ..................................... 395/700, 709

[56] References Cited

U.S. PATENT DOCUMENTS

| | | | |
|---|---|---|---|
| 4,595,981 | 6/1986 | Leung | 364/300 |
| 4,686,623 | 8/1987 | Wallace | 364/300 |
| 4,694,420 | 9/1987 | Pettet et al. | 364/900 |
| 4,696,003 | 9/1987 | Kerr et al. | 371/19 |
| 4,819,160 | 4/1989 | Tanka et al. | 364/300 |
| 4,827,404 | 5/1989 | Barstow et al. | 364/200 |
| 4,864,569 | 9/1989 | DeLucia et al. | 371/19 |
| 4,885,684 | 12/1989 | Austin et al. | 364/300 |
| 4,937,739 | 6/1990 | Ernst et al. | 364/200 |
| 4,953,084 | 8/1990 | Meloy et al. | 364/200 |
| 5,021,947 | 6/1991 | Campbell et al. | 364/200 |
| 5,093,914 | 3/1992 | Coplien et al. | 395/700 |
| 5,142,681 | 8/1992 | Driscoll et al. | 395/700 |
| 5,307,445 | 4/1994 | Dalal et al. | 395/66 |
| 5,381,547 | 1/1995 | Flug et al. | 395/700 |
| 5,488,727 | 1/1996 | Agrawal et al. | 395/700 |

OTHER PUBLICATIONS

Beaven, Stansifer, Wetklow, A Functional Language with Classes, Computing in the 90's, The 1st Great Lakes Computer Conference Proceedings, Ref. pp. 18–20, 1989.

O'Brien, Halbert, Kilian, The Trellis Programming Environment, OOPSLA '87 Proceedings, pp. 91–102, Oct. 4–8, 1987.

Schaffert, Cooper, Bullis, Kilian, Wilpolt, An Introduction to Trellis/Owl, OOPSLA '86 Proceedings, pp. 9–16, Sep. 1986.

(List continued on next page.)

*Primary Examiner*—Mark R. Powell
*Attorney, Agent, or Firm*—James C. Pintner

[57] ABSTRACT

Programming language systems commonly allow for the use of function calls within a body of program source code. Since function names are generally descriptive, it is sometimes the case that two different functions ("function instances") will have the same name, and be distinguishable by having either a different number of arguments ("arity"), or arguments of different types. Both at compile time and at run time, the possibility of error exists if there is a mismatch between the arguments required by a function and the arguments provided to the function by the function call. Methods and related apparatus, for use in programming language systems, are set forth which support compile-time type checking and run-time dispatch for overloaded functions in an environment supporting subtypes with multiple inheritance. At both compile time and run time, the method of the invention takes into consideration the types of all arguments of a function call, to select a proper function instance to execute, for a given function invocation. In accordance with the invention, a precedence ordering is made from among multiple function instances having the same name and arity. Furthermore, the methods contemplated by the invention identify at compile time the set of function instances which might be invoked due to subtype substitutions for the actual arguments. Since type errors on function invocations or variable assignments are usually indicative of a programming error, program reliability can be improved and faults that would otherwise result in run-time errors can be corrected through the use of the invention prior to program deployment.

57 Claims, 7 Drawing Sheets

OTHER PUBLICATIONS

Lecluse and Richard, Manipulation of Structured Values in Object–Oriented Databases, GIP Altair, France pp. 113–121.

Lomet, Hardware Assistance for Type Checking, IBM Corp. Technical Disclosure Bulletin, vol. 18, No. 12, pp. 4194–4197, May 1976.

Lafore, The Waite Group's C Programming Using Turbo C++, Chapter 16, C++ and Object–Oriented Programming, pp. 667–669.

Ellis, Stroustrup, The Annotated C++ Reference Manual, Book, Chapter 10, pp.208–213.

INDEX-BASED METHOD FOR SUPPORTING MULTIMETHOD FUNCTION OVERLOADING WITH COMPILE-TIME TYPE CHECKING AND RUN-TIME DISPATCH

FIELD OF THE INVENTION

The invention relates generally to methods used in modern programming language systems, including database query language systems, that support the notion of "typed" data to reduce (or eliminate) run-time errors that can result from a mismatch between types of program variables and the types of values assigned to such variables. A data "type" is defined herein to consist of a representation and a set of functions which can be applied to instances of the data type. For example, a "line" may be considered a data type, represented by a pair of points (or some other representation, such as a point, length and a slope), and a function that determines the length of a line is an example of a function that can be applied to "line" type data; a "string" may be considered a data type, represented by a character array, and a function that identifies a given pattern in the array exemplifies a function that can be applied to "string" type data; etc.

More particularly, the invention relates to methods (and related apparatus) for use in such programming language systems to support compile-time type checking for "overloaded functions" in an environment supporting "subtypes" with "multiple inheritance". At both compile time and run time, the invention considers the types of all "arguments" of a function to select a proper "function instance" to execute. Furthermore, the methods contemplated by the invention identify the set of function instances which might be invoked due to subtype substitutions for the actual arguments.

The terms, "overloaded functions", "subtypes", "multiple inheritance", "actual argument", "function instance", and many other terms well known to those skilled in the art will, for the sake of completeness and clarity, be defined hereinafter as part of the background section of the invention.

BACKGROUND OF THE INVENTION

PROBLEM DEFINITION

A number of prior art programming language systems, such as the C++ system, the Ada system, the Modula-3 system, the Smalltalk system, etc., support the aforementioned notion of typed data.

As indicated hereinbefore, a data type consists of a representation and a set of functions which can be applied to instances of the data type.

Functions may be thought of as parameterized program fragments which can be invoked (or called) from multiple points in a program. An important consideration in such systems is the correct matching between the types of program variables and the types of values assigned to them. Also, the types of the arguments of a function invocation and the argument types expected by the function body which is invoked must be compatible. Incorrect matches between the actual and formal parameters of a function invocation or between variables and their values can lead to unpredictable and incorrect program behavior.

In order to improve program reliability, the type correctness of function invocations and variable assignments can be checked by the programming language system during program preparation (compile time) or during program execution (run time). Compile-time type checking is preferred since it can prevent type errors from occurring after the program has been deployed. Additionally, type errors on function invocations or variable assignments are usually indicative of a programming error.

Given a programming language supporting typed data, it is useful to be able to "overload" function names. Function "overloading" allows multiple function instances (or bodies) to be denoted by the same function name. For example, in a programming language having shape types, for example, "circle", "triangle", "rectangle", etc., a function named "area" which accepts a shape type as an argument, and which calculates the area of the shape type, can be defined for each of the shape types. The same function name ("area") describes multiple function instances (e.g., area(circle), area (triangle), area(rectangle), etc.) which use the various well-known formulas for calculating the respective areas of the shape types. The different function instances employ different code strings and execution sequences. Together, these "area" function instances constitute an overloaded function.

Processing of invocations of overloaded functions must take into account the number and types of the function arguments at the point of invocation, and the number and types of the formal arguments of each instance of the overloaded function, to select the proper function instance to be executed.

Recent developments in programming technology, such as the aforementioned C++ systems, the CommonLoops, CLOS system, etc., have extended the semantics of data types to allow one type to be a subtype of one or more preexisting types (also referred to herein as systems that support multiparent subtypes). In addition, instances of a subtype may be substituted or used in contexts declared to use a supertype of the subtype. This means that an instance of a subtype may be assigned to a variable of one of its supertypes, or passed as an actual parameter to a function whose corresponding formal parameter is declared to be one of its supertypes.

In the foregoing example related to the function "area", a new shape "square" illustrates a subtype of the previously existing data type "rectangle". An instance of a square may be substituted or used in contexts declared to use the supertype rectangle in programming language systems which support subtypes (inheritance) and subtype substitutability.

It is well understood by those skilled in the art that substitutability of subtypes, in conjunction with function overloading, implies that a run-time decision among instances of the overloaded function may be required. Run-time selection of the function instance to be executed (also referred to herein as "DYNAMIC DISPATCH") may consider the type of only one argument or the types of all the actual arguments.

"SELFISH" function selection considers the type of only a single, distinguished argument.

"MULTIMETHOD" function selection considers the types of all arguments to select the function instance that most closely matches the argument types of the function call. One function instance may have argument types which precisely match the argument types of the function call. However, it may also be the case that, for a given strategy for evaluating a closeness between the arguments of a function call and the non-identical arguments of function instances, the arguments of one function instance may be characterized as being "closer" to those of the function call than the arguments of another function instance.

Existing examples of programming languages which support compile-time type checking, subtypes, function overloading and dynamic dispatch, such as the Trellis/Owl system, C++, etc., are "selfish", i.e., discriminate on only one of the function arguments (at run time) to choose between instances of an overloaded function. This provides the drawback that functional behavior for overloaded functions can be conditioned on only one of the function arguments.

Consider a selfish programming language, for example, in which "integer" is a subtype of "float". Consider also a function, defined in that programming language, called "MAX", which has instances $MAX_1$(integer,integer), $MAX_2$(float,float), $MAX_3$(integer,float) and $MAX_4$(float, integer).

The selfish system cannot always guarantee that the function instance that is the best match for a particular set of actual argument types will be the function instance that is selected for execution. For instance, suppose that the selfish system discriminates on only the first function argument (at run time).

If a function call of MAX(float,float) occurs in the program, then because run-time discrimination cannot occur on the second function argument, the function instance that will be invoked must be either $MAX_2$(float,float) or $MAX_3$(integer,float). Thus, if the actual arguments to the function invocation at run time were either MAX(float,integer) or MAX(integer,integer), the function instance that was an exact match for the actual argument types would not be selected for execution.

Accordingly, it would be desirable to provide a mechanism (and the invention described herein is such a mechanism) which efficiently supports subtyping (with multiple parent types), function overloading, compile-time type checking, and dynamic dispatch based on utilizing the types of all of the actual arguments, to select the proper function instance to execute.

Such a mechanism should guarantee that (1) every function instance receives arguments, passed to it by the function call, which are subtypes of the function instance's formal argument types; (2) at least one applicable function instance exists for every function invocation; (3) the actual result type of any function invocation is consistent with the context of the invocation; and (4) the set of function instances that might be invoked due to subtype substitutions for actual arguments is identified.

GLOSSARY OF TERMS TO BE USED

Before proceeding to summarize and then set forth the details regarding the methods and apparatus contemplated by the invention, the terms of art used herein, although well known to those skilled in the art, will be defined for the sake of completeness and clarity. Each of these terms (in quotes) is defined as follows:

"COMPILATION": The process or processes of analyzing statements or expressions in some programming language or query language to check for syntactic and semantic correctness and to prepare structures or code to be executed and/or to direct the execution of the statements or expressions of the language. The steps of compilation may or may not be separated in time from the execution of the compiled statements or expressions.

"CODE GENERATION": The preparation of structures or code to be executed and/or to direct the execution of the statements or expressions of the language.

"SUBTYPE": If type B is a subtype of type A, then every instance of B is also an instance of A. The subtype relationship "B is a subtype of A" is denoted by $B \leq A$. If $B \leq A$ and $A \neq B$, then B is a proper subtype of A (denoted B<A). Slashes through the relational operators will indicate the negation of the relational operator. For instance, $A \not\leq B$ indicates that A is not a proper subtype of B. The subtype relationship is transitive; i.e., if $B \leq A$ and $C \leq B$, then $C \leq A$.

If a subtype is a subtype of more than one type, then that subtype is said to have "MULTIPLE INHERITANCE". Under the notion of "subtype", we also include cases where one type is "PROMOTABLE" to another (e.g. an integer is promotable to a float; a small integer is promotable to an integer). If a first type is promotable to a second type, then that first type is considered a subtype of that second type. Also, note that any type is considered to be a subtype of itself.

"SUBSTITUTABILITY": If $B \leq A$, then an instance of B may be used wherever an instance of A may be used. B is substitutable for A because every instance of B is also an instance of A. In particular, if $B \leq A$, then an instance of B may be assigned to a variable of type A, and instances of B may be passed as arguments of functions whose formal arguments are of type A.

"FUNCTION INSTANCE": An executable function instance consists of a function name, a sequence of typed, formal arguments, a possible result type, and a code body. Function instances are executed with values, specified in the invocation, bound to the arguments. A function instance is denoted by $f_k(T^1_k, T^2_k, \ldots, T^n_k) \rightarrow R_k$, where $f_k$ is the k-t instance of the function named f, $T^j_k$ is the formal type of the j-t argument, and $R_k$ is the formal result type.

"FUNCTION ARITY": The number of arguments of a function. Arity is equally applicable to a function invocation or call, and a function instance.

"OVERLOADED FUNCTION": The set of function instances having the same function name and arity.

"FUNCTION INVOCATION": A call to a function embedded in a program, database query, statement, or expression. A function invocation is denoted by $f(T^1, T^2, \ldots, T^n)$, where "f" is the function name, and $T^i$ is the type of the i-t argument.

"FUNCTION INVOCATION EXECUTION": The performance of a function invocation at run time. The actual argument types are used, as needed, to select the most specific applicable function instance.

"FORMAL ARGUMENT TYPE": The type of an argument declared for a function instance.

"STATIC ARGUMENT TYPE": The declared or inferred type of an argument of a function invocation. Static types are determined during compilation using the declared or inferred types of variables specified as function invocation arguments or by analysis of expressions specified as function invocation arguments. The static argument type must be a subtype of the formal argument type.

"ACTUAL ARGUMENT TYPE": The type of the argument instance actually bound to a function argument during execution of a function invocation. The actual argument type may differ from one execution of a function invocation to another execution of the same function invocation. The actual argument type must be a subtype of the static argument type.

"APPLICABLE FUNCTION INSTANCE": An instance of a function is applicable to a function invocation (or execution of a function invocation) if the function name and function arity both match, and the (static or actual) type of each argument is a subtype of the corresponding formal argument type. More formally, the function instance $f_k(T^1_k, T^2_k, \ldots, T^n_k)$ is applicable to function invocation $f(T^1,T^2,\ldots,T^n)$ if and only if for every i, where $1 \leq i \leq n$, it is true that $T^i \leq T^i_k$. That is, each respective argument type of the function invocation is a subtype of the respectively corresponding argument type of the function instance.

"CONSISTENT WITH INVOCATION CONTEXT": A function invocation is consistent with the invocation context if (1) there is at least one applicable function instance for its static argument types, and (2) if a function instance can be selected for execution at run time due to the occurrence of instances of subtypes of any of the static argument types, then, (a) if the result of the function invocation is assigned to a variable, the result type of the function invocation is a subtype of the type of that variable; or (b) if the result of the function invocation is passed as an argument to an enclosing function invocation, then conditions (1) and (2) both hold for the enclosing invocation.

"FUNCTION INSTANCE CONFUSABILITY": Two function instances are confusable if they are both applicable to some function invocation. Formally, function instances $f_1(T^1_1,T^2_1,\ldots,T^n_1)$ and $f_2(T^1_2,T^2_2,\ldots,T^n_2)$ are confusable if for every i, where $1 \leq i \leq n$, there exists an argument type $T_i$, such that $T^i \leq T^i_1$ and $T^i \leq T^i_2$. That is, each respective argument type of the function invocation is a subtype of the respectively corresponding argument type of each of the confusable function instances. Conversely, two functions are confusable if there exists a common argument subtype for each pair of respectively corresponding argument types of the two functions.

"STATIC TYPE CHECKING": Checking during program compilation that there exists an applicable function instance for every function invocation and that the result type of every potentially applicable function instance is consistent with invocation context.

"FUNCTION INSTANCE SPECIFICITY": In order to choose between function instances applicable to a function invocation (or execution of a function invocation), a precedence relationship between confusable function instances is needed to select the function instance that most closely matches the function invocation (or execution of the function invocation). If one function instance has precedence over another, then it is more specific. Several examples of function instance precedence rules will be presented. This invention requires a function precedence rule to order confusable function instances, but it does not depend on which precedence rule is used. Examples include:

(1) "ARGUMENT SUBTYPE PRECEDENCE": If $f_1(T^1_1,T^2_1,\ldots,T^n_1) \rightarrow R_1$ and $f_2(T^1_2,T^2_2,\ldots,T^n_2) \rightarrow R_2$ are confusable, $f_1$ has argument subtype precedence (and is more specific than $f_2$) if ,for every i, where $1 \leq i \leq n$, it is true that $T^i_1 \leq T^i_2$, and that there exists some j, where $1 \leq j \leq n$, such that $T^j_1 \neq T^j_2$. Note that argument subtype precedence is sufficient to disambiguate all function invocations in systems which support single inheritance and selfish function selection. However, argument subtype precedence is not sufficient to order all confusable function instances in a system with single inheritance and multimethod function selection.

(2) "ARGUMENT ORDER PRECEDENCE": If $f_1(T^1_1, T^2_1,\ldots,T^n_1) \rightarrow R1$ and $f_2(T^1_2,T^2_2,\ldots,T^n_2) \rightarrow R_2$ are confusable, then $f_1$ will be said to have argument order precedence (and to be more specific than $f_2$) if there exists some first argument position k, where $1 \leq k \leq n$ for functions of n arguments, such that $T^k_1 < T^k_2$, and if, for every m, where $1 \leq m < k$, it is true that $T^m_1 = T^m_2$. It should be noted that the order of argument significance can be any permutation of the argument order. However, it must be uniform for all the function instances of a given name and arity. Furthermore, it should be noted that argument order precedence is sufficient to disambiguate all function invocations in systems with single inheritance and multimethod dispatch. For example, consider a system having types B<A and D<C, and function instances $f_1(A,D)$ and $f_2(B,C)$. The functions $f_1$ and $f_2$ do not have argument subtype precedence, but they do have argument order precedence with $f_2$ preceding $f_1$.

(3) "GLOBAL TYPE PRECEDENCE": A partial order over types is established such that (i) subtypes precede their supertypes and (ii) any two types $T_1$ and $T_2$, where $T_1 \leq T_2$ and $T_2 \leq T_1$, and which have a common subtype, are ordered by user directive, or according to some global rule (e.g., time of type definition). More precisely, if A<B, then A precedes B; and if C<D and C<E, then either D precedes E or E precedes D. If $f_1(T^1_1,T^2_1,\ldots,T^n_1) \rightarrow R_1$ and $f_2(T^1_2,T^2_2,\ldots,T^n_2) \rightarrow R_2$ are confusable, $f_1$ has global type precedence (and is more specific than $f_2$) if there exists some first argument position k, where $1 \leq k \leq n$, such that $T^k_1$ precedes $T^k_2$, and for every m, where $1 \leq m < k$, it is true that $T^m_1 = T^m_2$. Note that global-type precedence is sufficient to disambiguate all function invocations in systems with multiple inheritance and multimethod dispatch. For example, consider a system with types C<A and C<B, where the user has specified that the type A is to precede the type B in precedence. Given function instances $f_1(C,A)$ and $f_2(C,B)$, $f_1$ precedes $f_2$ in precedence, due to global-type precedence, because the type A precedes the type B in the global-type ordering.

It should be noted that the ordering between inherited (parent) types must be defined when a subtype is defined. The ordering must be consistent with any previously established orderings.

(4) "INHERITANCE ORDER PRECEDENCE": Let $f_1$, $(T^1_1,T^2_1,\ldots,T^n_1) \rightarrow R_1$ and $f_2(T^1_2,T^2_2,\ldots,T^n_2) \rightarrow R_2$ be function instances applicable to the function invocation $f(T^1,T^2,\ldots,T^n) \rightarrow R$. Furthermore, assume that $f_1$ and $f_2$ are not ordered by argument subtype or argument order precedence. Then, let there be a first argument position k, such that $T^k_1 \leq T^k_2$ and $T^k_2 \leq T^k_1$. However, both $f_1$ and $f_2$ are applicable to function invocation f, because $T^k \leq T^k_1$ and $T^k \leq T^k_2$. This can occur when $T^k$ (or some ancestor type) multiply inherits from $T^k_1$ and $T^k_2$. Inheritance order precedence orders the supertypes of a type such that, for every pair of supertypes, $T_a$ and $T_b$ of a type T, it will be true that either $T_a$ precedes $T_b$ or $T_b$ precedes $T_a$, with respect to a type T. This order can be specified by the user when the type T is created, or the order can be inferred from the lexical order of immediate supertypes given in the specification of type T.

Inheritance order precedence can be defined as follows: $f_1$ has inheritance order precedence over $f_2$ with respect to a function invocation f at argument position k if $T^k_1$ precedes $T^k_2$ with respect to type $T^k$. For example, consider four types A, B, C, and D, whose subtype relationships with each other are given by the expressions C<A, C<B, D<A, and D<B. Also, let the inheritance order be A precedes B with respect to type C and B precedes A with respect to type D. Now, the function instances $f_1(A)$ and $f_2(B)$ are both applicable to a function invocation f(C). Note that $f_1$ and $f_2$ have neither argument subtype precedence, nor argument order precedence. However, $f_1$ has inheritance order precedence for the invocation f(C) because type C inherits from type A before it inherits from type B.

"MOST SPECIFIC APPLICABLE FUNCTION INSTANCE": Given a precedence order among the function instances applicable to a function invocation (or execution of a function invocation), the most specific applicable function instance is the function instance having highest precedence. The most specific applicable function instance of a static function invocation is the least specific applicable function that may be executed by that invocation. This follows from the fact that the actual argument types of the function invocation must be subtypes of the static argument types.

"POTENTIALLY APPLICABLE FUNCTION INSTANCE": A function instance is potentially applicable to a function invocation if it is the most specific applicable function instance or is more specific than the most specific applicable function instance and is confusable with the static function invocation.

"FUNCTION INSTANCE CONSISTENCY": Two function instances are consistent if they are not confusable. Otherwise, if $f_1(T^1{}_1, T^2{}_1, \ldots, T^n{}_1) \to R_1$ and $f_2(T^1{}_2, T^2{}_2, \ldots, T^n{}_2) \to R_2$ are confusable, they are consistent if the following three conditions are true: (i) there exists k such that $T^k{}_1 \neq T^k{}_2$, (ii) if $f_1$ has precedence over $f_2$, then $R_1 \leq R_2$, and (iii) if $f_2$ has precedence over $f_1$, then $R_2 \leq R_1$. It should be noted that in the case of INHERITANCE ORDER PRECEDENCE (defined above), $f_1$ may be both more and less specific than $f_2$ and therefore the result types $R_1$ and $R_2$ must be the same.

PRIOR ART

Having rigorously defined the terms of art used herein, the invention may now be described with reference to these terms. First, however, it should be recognized that several concepts related to the invention are described or alluded to in recent publications, although no one reference or combination of references is known which describes any one mechanism or set of mechanisms which have the desirable characteristics as outlined hereinbefore.

In particular, an article by Lécluse and Richard entitled "Manipulation of Structured Values in Object-oriented Databases", appearing in the Proceedings of the Second International Workshop On Database Programming Languages (published in 1989), alludes to multimethod dispatch; however, no specific mechanism or procedure is set forth for checking that an applicable method exists.

An article by P. Dussud, entitled "TICLOS: An Implementation of CLOS for the Explorer Family", OOPSLA (1989), as well as an article by Kiczales and Rodriguez, entitled "Efficient Method Dispatch in PCL", presented at the Conference on Lisp and Functional Programming (1990), describe procedures for run-time dispatching of multimethod generic functions. However these articles do not discuss compile-time type checking or the novel application of the concepts of confusability and potentially applicable methods which are demonstrated hereinafter to be utilized in realizing the methods contemplated by the invention.

Most recently, Mugridge, Hammer, and Hosking, in an article entitled "Multi-methods in a Statically-Typed Programming Language", Report No. 50, published by the Department of Computer Science, University of Auckland (1991), although describing the notion of "Potentially Applicable Functions" under the rubric "relevant variants", and the notion of a run-time dispatch for the "relevant variants", fails to teach or even suggest how to obtain and exploit an ordering of confusable methods (i.e., method precedence rules). Again, the use of an ordering of confusable methods, etc., will be demonstrated as part of the solution, in accordance with the teachings of the invention, to achieve the aforementioned desirable mechanisms and procedures which support multimethod function overloading with compile-time type checking.

SUMMARY OF THE INVENTION

Accordingly, it is an object of the invention to provide methods (and related apparatus), for use in programming language systems, including database query language systems, which efficiently support subtyping (with multiple parent types), function overloading, and compile-time (static) type checking. The aforesaid methods and apparatus support dynamic dispatch based on the utilization of all of the actual arguments types (to select the proper function instance to execute).

Furthermore, it is an object of the invention to provide methods (and related apparatus), for use in programming language systems, including database query language systems, which identify the set of function instances that might be invoked due to subtype substitutions for actual arguments.

It is an object of the invention to provide methods (and related apparatus), for use in programming language systems, including database query language systems, which guarantee that every operation receives operands of the correct type and that every function invocation has at least one applicable function instance.

It is still a further object of the invention to provide methods (and related apparatus), for use in programming language systems, including database query language systems, which guarantee that the actual result type of any method (function) invocation will be consistent with the invocation context.

Further yet, it is an object of the invention to provide methods (and related apparatus), for use in programming language systems, including database query language systems, which improve program reliability by preventing type errors from occurring after a program has been deployed.

According to the invention, it is assumed that a programmer, type definer, etc., has created a set of type definitions (including specification of subtype relationships), function (method) definitions, and precedence rules (if not inherently contained in the programming language system itself) for ordering function instances for a given set of arguments; and that these definitions and rules serve as inputs to the programming language system in which the invention is implemented.

In accordance with one aspect of the invention, these inputs are processed to prepare for the compile-time type checking of function invocations and ultimate determination of which instance of an overloaded function to call. This preparation process can take place independently of the compilation process (such as before compile time), or be incorporated into the compilation process.

In either event, the preparation process comprises the steps of: (a) creating, from the input type definitions, a first data structure for representing subtype relationships between data types; (b) storing said first data structure; (c) creating a grouping of function instances according to name and arity, from the input function definitions, and creating a second data structure for the efficient access of those function instances of a given name and arity; (d) ordering the function instances so grouped for each given name and arity, from the input function definitions, the precedence rules, and the first data structure, and creating a third data structure for the efficient access of those function instances of a given name and arity according to that ordering; (e) optionally verifying consistency among the ordered function instances; and (f) storing the groups of ordered function instances for later use during the compilation process, and storing the data structures created in steps (c) and (d) for their efficient access.

In cases where the preparation process just given is incorporated into the compilation process, it will be understood from step (f) above that the process just given takes place prior to any portion of the compilation process that requires the stored ordered function instances.

Obvious variants of the aforestated method, such as methods which replace the step of "storing" with "outputting" a set of values and/or immediately using (instead of storing) such values, etc., are all contemplated by the invention.

Additionally in accordance with the invention, the second and third data structures may be combined. Also, the third data structure may be omitted if the second data structure is used, and if an additional method step is practiced, of dynamically ordering function instances of a given name and arity based on function precedence.

Following the performance of steps (a)–(f) of the preparation process just given, a further aspect of the invention includes a method, performed at compilation time, which takes as input a source program, a first data structure such as that produced by the preparation process given above, and ordered function instances for each function name and arity.

In accordance with the invention, this further aspect of the invention comprises the steps of: (1) selecting a set of function instances that are potentially associated with a function invocation, the selection being based on the name and arity of the function invocation; (2) determining, from the selected set, the most specific applicable function instance for the static argument types of the function invocation; (3) checking that the result type of that most specific applicable function instance is consistent with the static invocation context in which that function invocation occurs; (4) identifying a subset of potentially applicable function instances (i.e., function instances that might be invoked at run time, instead of the most specific applicable function instance, for the static argument types of the function invocation) that might be called due to allowable substitutions of subtype instances as actual arguments; and (5) optionally creating a plurality of fourth data structures (e.g., decision tables) for the respective function instances identified in the previous step, wherein the fourth data structures may be utilized at the time of execution of the program to facilitate dynamic selection of the most specific applicable function instance for the types of actual arguments of the invocation.

According to a further aspect of the invention, the two processes just described (process steps (a)–(f) and process steps (1)–(5)) may be practiced separately, or may be combined into a single process such as an overall compilation process.

Additionally in accordance with the invention, the fourth data structure may be omitted, and the actual argument types of the function invocation at run time may be used to select the single most specific applicable function instance.

Yet another method step forms an additional aspect of the invention. This other method step may be practiced separately, or may also be combined with the above two processes, in accordance with the invention, to more fully realize the aforestated objects.

This further step includes selecting the most specific applicable function instance for the types of actual arguments of the invocation (dynamically at run time) and executing that function instance. This last step is typically performed after the compilation phase is complete, in a program execution module which may be located either within or outside the programming language system.

Steps (a)–(f) can be performed once for a given set of types, function instances, and precedence rules. As indicated hereinabove, steps (1)–(5) are performed during compilation of a function invocation, and the aforementioned last step is performed during execution of a function invocation, at run time. It should be noted that this last step may, according to one embodiment of the invention, be unnecessary and eliminated when only one function instance is potentially applicable.

The use of a function precedence order, the extension of that partial order to a total order over a set of function instances of the same name and arity, and the use of data structures created for the efficient access of those function instances of a given name and arity according to that ordering, further refines the search for applicable function instances during compilation and at run time.

The invention describes mechanisms (methods and apparatus) that can be used to implement a programming language environment that supports some or all of the following features:

(1) COMPILE-TIME TYPE CHECKING: ensuring, during program compilation, that an applicable function instance exists for every function invocation in the program and that the result type of every function instance that might be called, at run time, is consistent with the invocation context;

(2) MULTIPARENT SUBTYPES: subtype instances, supporting the behavior of multiple parent types, may appear anywhere that any of their ancestor types are expected without violating the type correctness of the program;

(3) OVERLOADED FUNCTIONS: several instances of a function of a given name and a given arity may be defined subject only to consistency rules and the existence of a precedence order between confusable function instances;

(4) RUN-TIME FUNCTION SELECTION: the function instance executed at run time is selected using the types of the actual arguments (where the actual argument types may be subtypes of the static argument types) from a set of the potentially applicable functions, which is a subset of the entire set of functions of a given name and arity, and likewise a subset of the even larger generic set of functions; and (5) MULTIMETHOD FUNCTION SELECTION: the selection of the function instance to be executed depends on the types of all of the arguments to the invocation.

This invention describes mechanisms and methods for achieving all of the above features by analyzing, organizing, checking, and choosing function instances.

Additionally, the use of function precedence order rules will be shown to be useful in efficiently searching for applicable function instances, both within a set of functions of a given name and arity at compile time, and among the potentially applicable function instances at run time.

These and other objects and features of the invention will be recognized by those skilled in the art upon reviewing the detailed description set forth hereinafter in conjunction with the accompanying drawing.

DETAILED DESCRIPTION OF THE PREFERRED EMBODIMENTS

SYSTEM DESCRIPTION

Figure 1:
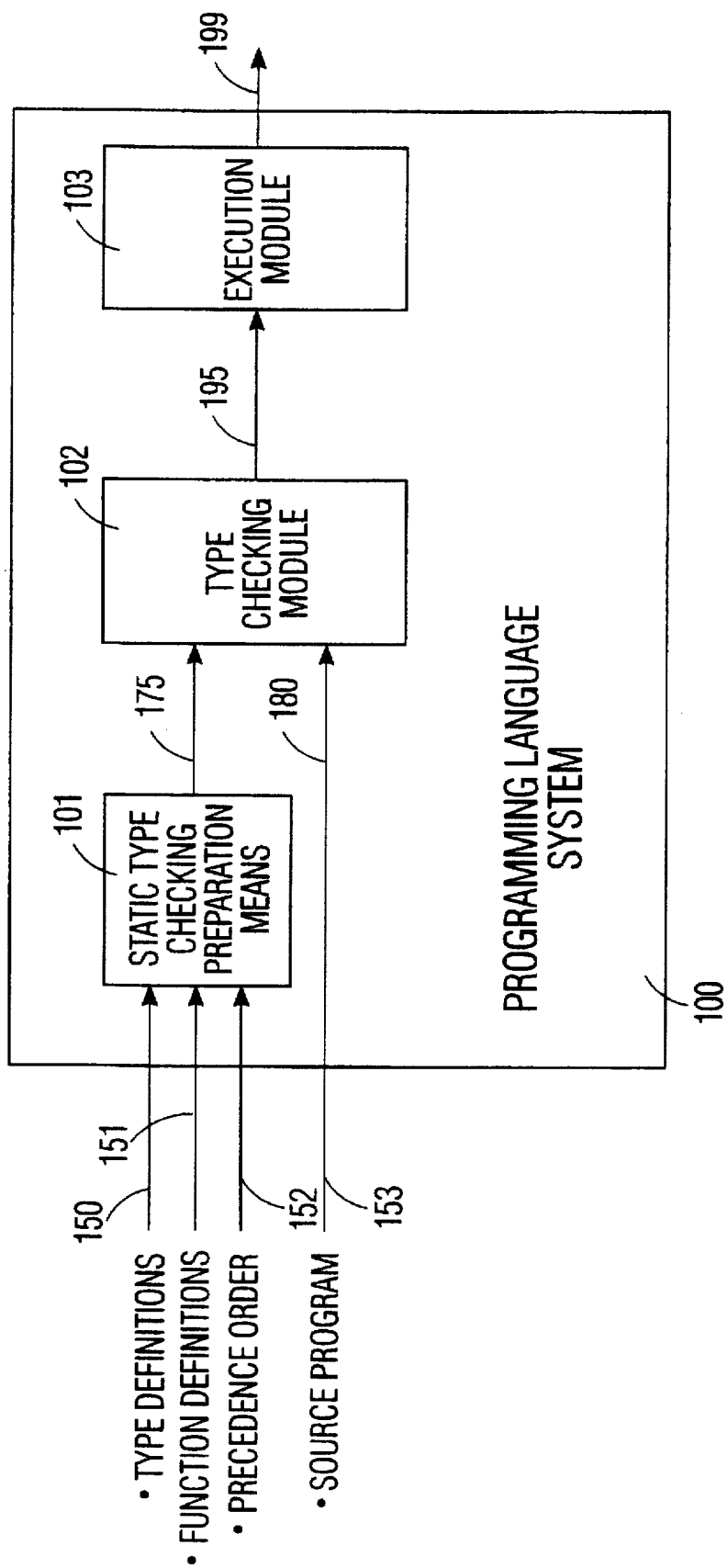
FIG. 1 is a block diagram representation of a programming language system (which could include a database query language system) in which the invention may be implemented.

FIG. 1 is a block diagram representation of a programming language system (which could include a database query language system) in which the invention may be implemented and practiced. An illustrative programming language system, depicted in FIG. 1 as a Programming Language System 100 (PLS 100), is shown to include a static-type checking preparation means 101, a type checking module 102, and an execution module 103.

It will be understood throughout this Specification, that the elements described as "means," "modules," etc. are preferably implemented as computer programs in the programming language of the Programming Language System 100. The Programming Language System itself includes a suitable processor, memory, storage, bus, and input/output architecture, as would be familiar to a person skilled in the art.

Thus, aspects of the invention which are described as methods including various method steps are preferably computer implemented methods, to be practiced by producing program code including suitable instructions in the programming language of the Programming Language System 100 to implement the method as described.

Figure 7:
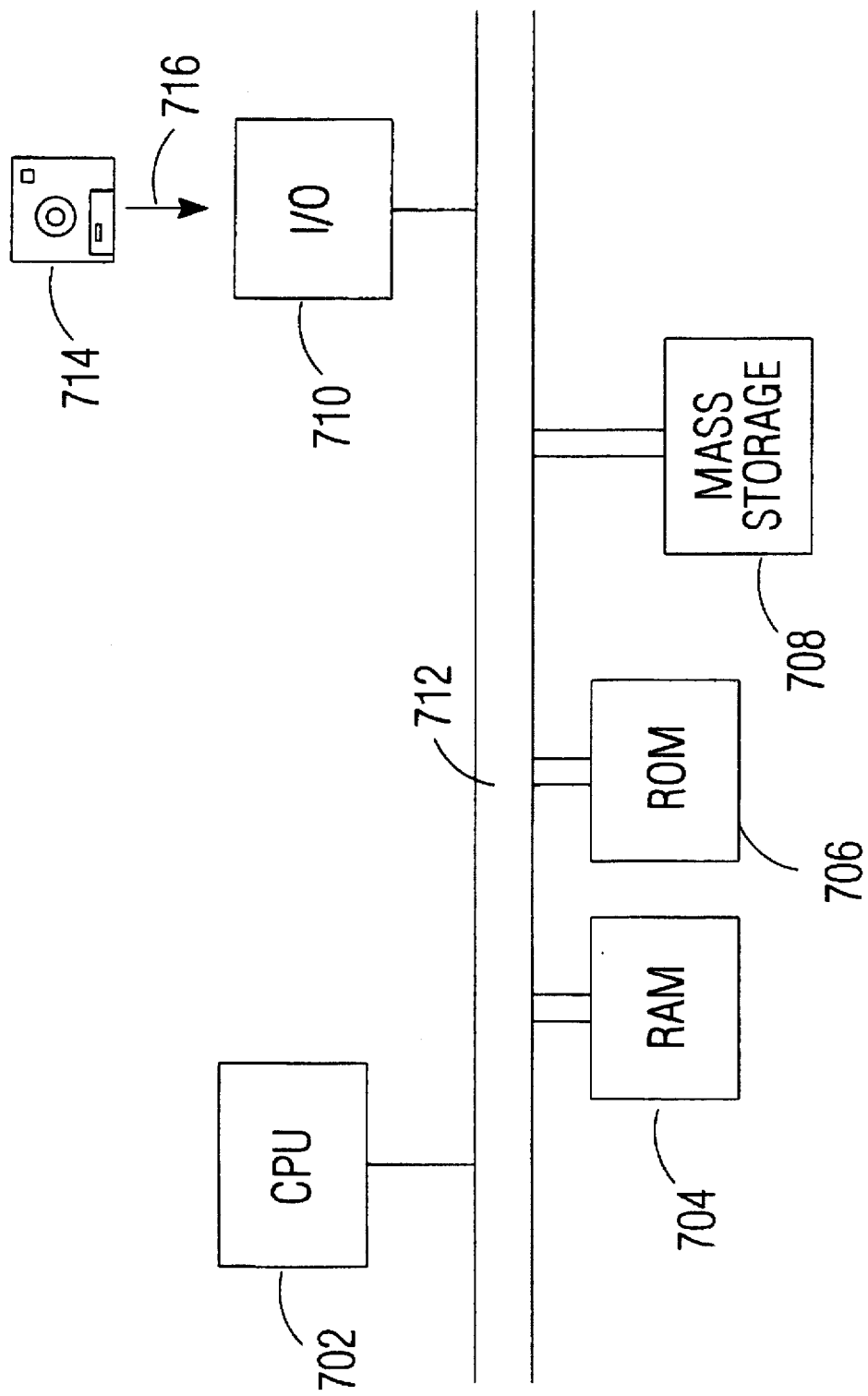
FIG. 7 is a block diagram of a processing system for performing the method of the invention.

The invention may also be implemented as a system. FIG. 7 is a representative block diagram of one possible system for practicing the invention, including a processor 702, various memory resources including Random Access Memory 704, Read Only Memory 706, a mass storage device 708 such as a hard disk drive, and an input/output subsystem 710 including such user interface devices as a keyboard, video monitor, printer, etc., coupled to a bus 712. Numerous different configurations of such a system for practicing the invention will be familiar to persons skilled in the art.

Additionally, the novel, non-obvious, and useful aspects of the invention may be implemented as an article of manufacture including a recording medium, suitable for being read by an input/output device if a processing system, and program instructions recorded on the recording medium. The recording medium is shown in FIG. 7 as a floppy disk 714, to suitable to be read by a floppy disk drive included as part of the input/output subsystem 710. An arrow 716 indicates that the floppy disk is to be inserted into the floppy disk drive of the input/output subsystem 710. Alternatively, the recording medium could be a cassette or other tape, or other suitable article of manufacture for providing prerecorded program code to be executed by such a processing system, that would be known to persons skilled in the art.

It is well known that computers and processing systems perform functions under the direction or program instructions written as computer programs. Therefore, where a given computer program directs a computer or processing system to perform a method including a sequence of method steps, it may accurately be said that the portions of the computer program which direct the computer to perform the various steps of the method constitute "means for directing" the computer or processing system to perform the various method steps. Such program instruction means may be stored in the computer system, such as in the Read Only Memory 706, or may be recorded on the recording medium, such as the floppy disk 714. Accordingly, the new, useful, and non-obvious aspects of the invention to be described herein may be implemented as program instruction "means" for directing a suitable computer or processing system to perform the method steps of the invention, and may be recorded on the floppy disk 714 for separate sale, transportation, etc., in accordance with the invention.

Returning to FIG. 1, the PLS 100 is presented for the sake of illustration only. Those skilled in the art will readily appreciate that, for example, the execution module 103 (or its equivalent) could be located apart from the programming language system. The static-type checking preparation means 101 and the type checking module 102 could be combined in a compilation module within the PLS 100. The static-type checking means 101 could be eliminated altogether, if the output of the static-type checking preparation means 101 (to be described in detail hereinafter) were presented as a data set to the type checking module 102, etc.

In FIG. 1, the static-type checking preparation means 101 is shown receiving the following inputs: (1) a set of type definitions; (2) a set of function definitions; and (3) the precedence ordering information referred to hereinbefore. These items are received via illustrative input links 150–152, respectively.

Located within the static-type checking preparation means 101, but not explicitly depicted in FIG. 1, are means, such as suitable program code instructions, for performing the aforementioned "preparation process" for the static-type checking of function invocations.

As discussed above, the preparation process includes the following steps: (a) creating, from the input-type definitions, a first data structure for representing subtype relationships between data types; (b) storing said first data structure; (c) creating a partitioning of function instances according to name and arity, from the input function definitions, and creating a second data structure for the efficient access of the function instances of a given name and arity; (d) ordering the function instances for each name and arity, from the input function definitions, the precedence rules, and the first data structure, and creating a third data structure for the efficient access of the function instances of a given name and arity according to this ordering; (e) optionally verifying consistency among the ordered function instances; and (f) storing the groups of ordered function instances for each name and arity, and storing the data structures created under (c) and (d) for their efficient access.

The collective outputs available at the completion of these method steps include the stored second and third data structures produced in steps (c) and (d), respectively. The outputs also include grouped and ordered function instances for each function name and arity.

These collective outputs are provided as inputs to the type-checking module 102, together with the source program being compiled, via a link 175. Similarly, a source program to be compiled is supplied to the type-checking module 102 via an input 153 and a link 180.

According to the illustrative embodiment of the invention being presented with reference to FIG. 1, the type-checking module 102 includes means, such as suitable program code instructions, for performing the following steps: (1) efficiently selecting the function instances that are potentially associated with a function invocation based on the name and arity of the function instances; (2) determining, from the function instances selected, the most specific applicable function instance for the static argument types of the function invocation; (3) checking that the result type of that function instance is consistent with the static invocation context in which it occurs; (4) identifying potentially applicable function instances (i.e., selected function instances, other than the most specific applicable function instance, that might be invoked at run time, for the static argument types of the function invocation) called due to allowable substitutions of subtype instances as actual arguments; and (5) optionally creating a plurality of fourth data structures (e.g., decision tables) for the respective function instances identified in the previous step, wherein the fourth data structures may be utilized at the time of execution of the program to facilitate dynamic selection of the most applicable function instance for the types of actual arguments of the invocation.

The fourth data structures are input to the execution module 103 via a link 195. The execution module 103 uses the fourth data structure for the function invocation, at the time of program execution, or "run time", to facilitate dynamic selection of the most applicable function instance for the types of actual arguments of the function invocation. As indicated hereinbefore, this last step is typically performed after compilation is complete in a program execution module. The program execution module may be located either within or outside the programming language system. A link 199, which is shown in FIG. 1 as leaving the PLS 100 from the execution module 103, represent, an object code output path from the PLS 100.

The methods implemented at each of the blocks shown in FIG. 1 will be described in detail hereinafter with reference to the flowcharts presented in FIGS. 5 and 6. First, however, a brief overview of the functions performed by the invention over time will be discussed, with reference to FIG. 2. Also, several examples will be presented with reference to FIGS. 3A, 3B, and 4. This discussion will help to explain the concepts of type, subtype, cyclic relationships, consistency checking for the purpose of preventing run-time errors, and confusability.

Figure 2:
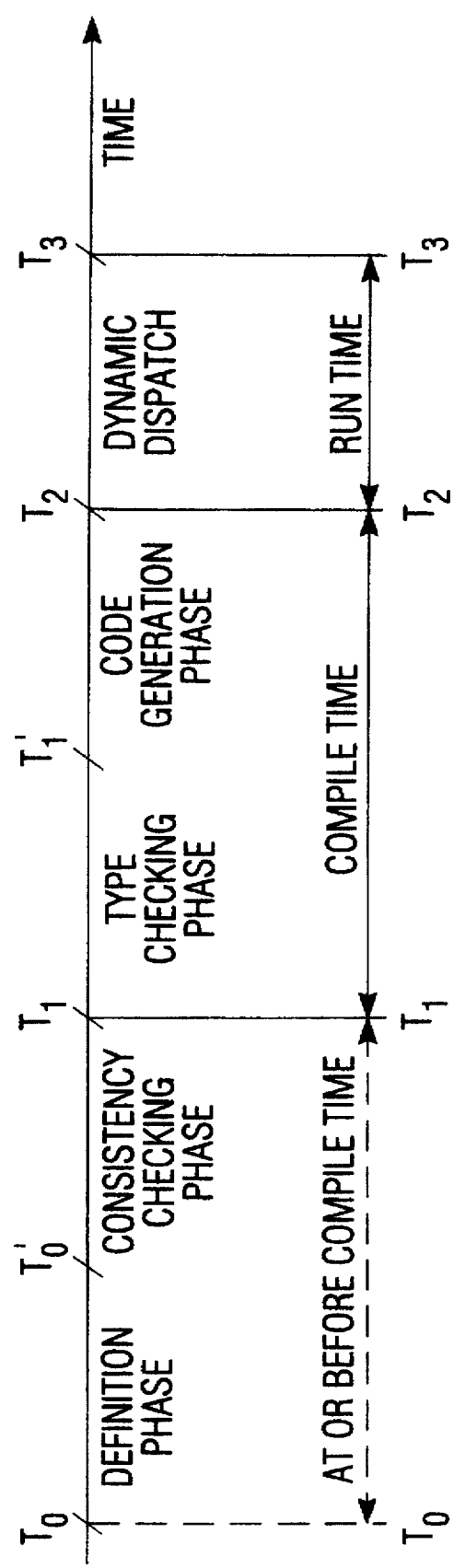
FIG. 2 depicts, in the form of a timeline, the definition phase, consistency checking phase, type checking phase, and code generation phase of preparing a program for execution, and the dynamic dispatch phase during which a program is actually run. Each of the aforementioned phases represents a period of time during which at least one of the method steps contemplated by the invention may be practiced.

FIG. 2 depicts, in the form of a timeline, the definition phase, consistency checking phase, type checking phase, and code generation phase of preparing a program for execution, and the dynamic dispatch phase during which a program is actually run. Each of the aforementioned phases represents a period of time during which at least one of the methods or method steps in accordance with the invention may be practiced.

In particular, steps (a)–(f) of the preparation process discussed above are, according to one embodiment of the invention, performed prior to compilation time (which starts at time $T_1$ in FIG. 2) between times $T_0$ and $T_1$ shown in FIG. 2. Alternatively, these steps may be performed at compile time, as part of the compilation process.

As indicated hereinbefore, the illustrative static-type checking preparation means 101 (which was shown in FIG. 1 and will be described in more detail below) may be used to perform these steps.

Steps (a) and (b) are, for the sake of illustration, assumed to be performed during the "definition" phase, shown as time interval $T_0$–$T_0'$ in FIG. 2. Steps (c)–(f) of the preparation process are, for the sake of illustration, performed during time interval $T_0'$–$T_1$, where interval $T_0'$–$T_1$ is referred to as the "consistency checking" phase of the invention in FIG. 2.

The compilation process illustrated with reference to FIG. 2 spans time interval $T_1$–$T_2$. During this time interval, the illustrative compilation module accepts a source program together with inputs from the depicted definition and consistency checking phases. These inputs have been described hereinbefore.

The "type checking" phase depicted in FIG. 2 is an exemplary time interval during which steps (1)–(3) set forth hereinbefore may be practiced by illustrative type-checking module 102 (shown in FIG. 1).

The "code generation" phase depicted in FIG. 2 is shown as occurring during the time interval $T_1'$–$T_2$. This is the illustrative time interval over which the compilation module actually generates code, assuming the input source program meets the static type checking criteria established by the methods contemplated herein. Such criteria might, for instance, include determining that a most specific applicable function instance exists (using the static types of the function invocation), and that the most specific applicable function instance is consistent with the context of the function invocation, etc.

Again, the code generation phase may be performed separately or in conjunction with the type checking phase.

One objective of the code generation phase is to identify the function instances that might be invoked at run time, called due to allowable substitutions of subtype instances as actual arguments. Another objective is to create a plurality of fourth data structures (for example, decision tables) for the respective function instances so identified. These fourth data structure are to be used, at the time of execution of the program, to facilitate dynamic selection of the most applicable function instance for the types of the actual arguments of the invocation. Also, errors are identified and flagged if the aforementioned criteria are not met.

The code generation phase is the time period during which, according to the illustrative embodiment of the invention being described herein, steps (4) and (5) of the type-checking method set forth hereinbefore may be practiced. Alternatively, steps (4) and (5) of the type-checking method may be practiced during the "type-checking" phase.

FIG. 2 also depicts the "dynamic dispatch" (run-time) phase of the invention, which may be practiced in combination with, or independently of, the aforestated methods. The aforementioned step of selecting the most specific applicable function instance for the types of actual arguments of the invocation (dynamically at run time) and executing that function instance is, according to one embodiment of the invention, practiced during the dynamic dispatch phase occurring during time interval $T_2$–$T_3$ as shown in FIG. 2. As previously indicated, this step is typically performed after the compilation phase is complete, in a program execution module which may be located either within or outside the programming language system.

OPERATION

A description of an exemplary programming language system in which the invention may be implemented and having given a time-oriented frame of reference for practicing the methods contemplated by the invention has been given above. Now, attention is directed to FIGS. 3A, 3B, and 4, which, as indicated hereinbefore, may be useful in explaining the principles of consistency checking, the notion of confusability, and the general utility of the invention in preventing run-time errors.

Figure 3A:
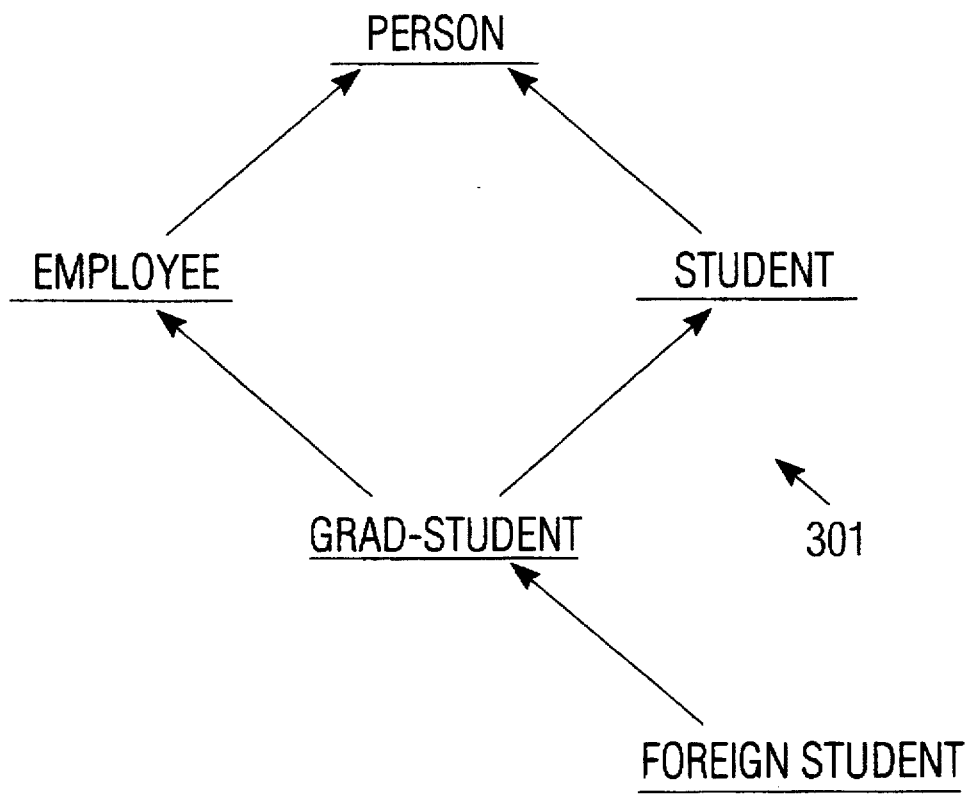
FIGS. 3A and 3B depict graphs which illustrate several concepts that are useful in understanding the principles of the invention. In particular, the concepts of type, subtype, and acyclic relationships are explained with reference to FIGS. 3A and 3B.
Figure 3B:
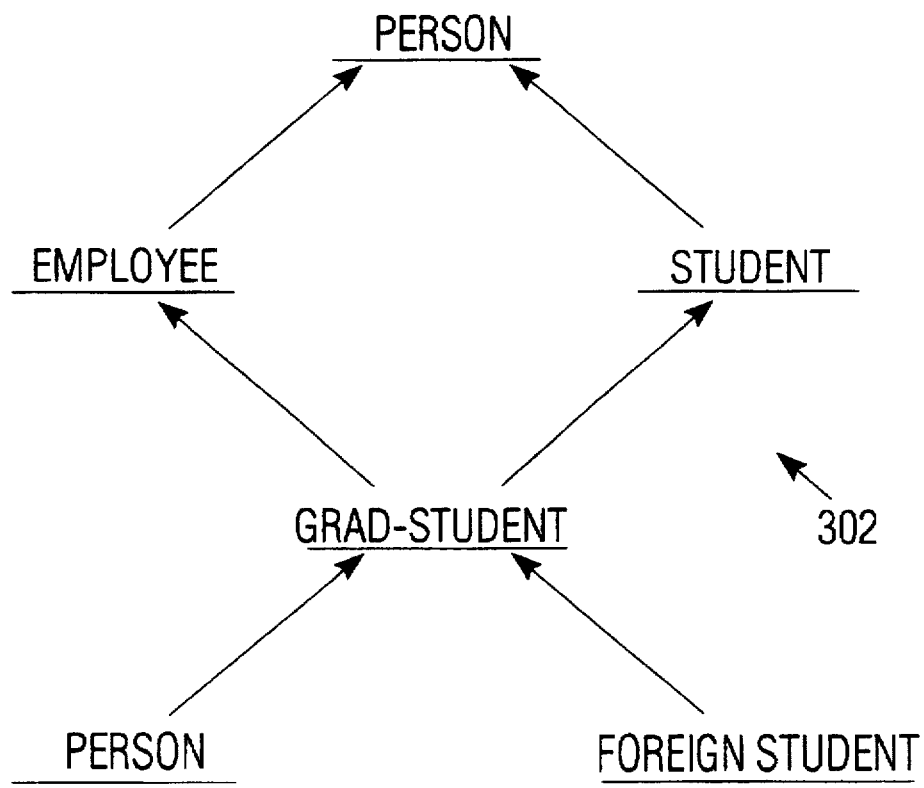

FIGS. 3A and 3B depict graphs which illustrate the concepts of type, subtype, and (forbidden) cyclic relationships. It is well known in the art that type relationships can be represented by directed acyclic graphs. In FIG. 3A, one such graph 301, is shown with "person" being a data type having "employee" and "student" as subtypes. Further down the hierarchical structure represented by the directed acyclic graph 301 are types "grad-student" (a subtype of both "student" and "employee") and "foreign student", defined as a subtype of "grad-student".

Based on the definition of subtype as set forth hereinbefore, it is clear that every "employee" is a "person"; every "student" is a "person"; every "grad-student" is both an "employee" and a "student"; and that every "foreign student" is a "grad-student".

The type/subtype relationships defined in the graph 301 of FIG. 3A represent the kind of information provided to the static-type checking preparation means 101. From that information, the aforementioned first data structure can be created, using techniques well known to those skilled in the art. An example of a published technique for realizing step (a) of the preparation process will be discussed hereinafter, with reference to the description of the flowchart depicted in FIG. 6A.

An example of a relationship that would cause a type consistency error to be flagged by the invention (during the consistency checking phase) is depicted in FIG. 3B. In a graph 302, "person" is defined as a subtype of itself. This is referred to as a "CYCLIC" relationship. Such a relationship is considered illegal, since it would not support creating the first data structure needed to make dynamic dispatch decisions, as called for by the invention. According to a preferred embodiment of the invention, this type of error would be identified and flagged during the consistency checking phase depicted in FIG. 2.

Figure 4:
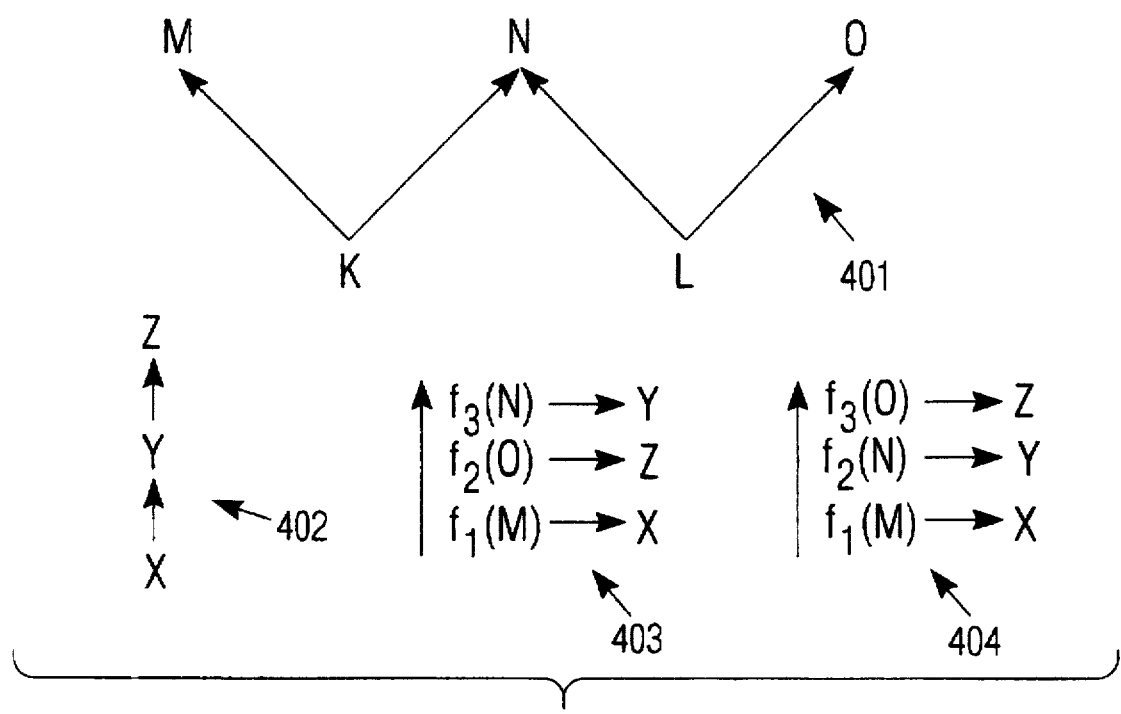
FIG. 4 illustrates a specific type of consistency problem which the invention is designed to identify and flag to prevent run-time errors. In particular, a comparison between a set of consistent and inconsistent type, function, and precedence relation definitions is made with reference to FIG. 4.

Reference should now be made to FIG. 4 for an illustration of another type of consistency problem which the invention is designed to identify and flag to prevent run-time errors; namely, errors resulting from inconsistencies in the definition of type, function, and precedence relations input into a programming language system.

FIG. 4 depicts a type definition (via a directed acyclic graph 401) in which K is a subtype of both M and N, and L is a subtype of both N and O. Also depicted in FIG. 4 is another graph 402, reflecting the definition of X as a subtype of Y and Y being a subtype of Z.

An overloaded function f is depicted in a table 403 of FIG. 4. Three function instances of the overloaded function f are shown: $f_1(M) \rightarrow X$, $f_2(O) \rightarrow Z$, and $f_3(N) \rightarrow Y$. Of these three function instances, the function instances $f_1$ and $f_3$ are confusable, in that the formal arguments of $f_1$ and $f_3$ have a common subtype K. Also, the formal arguments of $f_3$ and $f_2$ are confusable, in that the formal arguments of $f_3$ and $f_2$ have a common subtype L.

It should be noted that confusability is not transitive in that the formal arguments of $f_1$ and $f_2$ share no common subtype. A sample precedence ordering of these function instances is represented by the upgoing arrow shown alongside the table 403 in FIG. 4. As a result of the precedence ordering shown alongside the table 403, the result types are inconsistent with the definition of the type hierarchy depicted in the graph 402, in which Y is a subtype of Z. Accordingly, during the consistency checking phase depicted in FIG. 2, the invention identifies and flags the definitions, contained in the graphs 401 and 402 and in the table 403, as inconsistent, in order to avoid run-time errors.

An alternate definition and precedence ordering for function f is defined in a table 404. According to the table 404, $f_1(M) \rightarrow X$, $f_2(N) \rightarrow Y$, and $f_3(O) \rightarrow Z$. Clearly with this set of definitions (the graphs 401 and 402 together with the table 404), there is no consistency problem between the results of the functions $f_1$, $f_2$, or $f_3$, and the type definition input to the programming language system in which the invention is implemented.

The methods implemented at each of the blocks shown in FIG. 1 will now be described in detail with reference to the flowcharts presented in FIGS. 5 and 6.

The set of method steps depicted in FIGS. 5 and 6, explained in detail hereinafter, is but one embodiment of the invention which realizes the objects set forth above. The way in which this embodiment may be implemented is described with reference to pseudocode for the sake of illustration and convenience. Any type of hardware, software, or combination of hardware and software that functions to perform the particular method steps (or their equivalent) as set forth in the claims is intended to be within the scope of the invention, notwithstanding the particular implementation set forth hereinafter.

Figure 5:
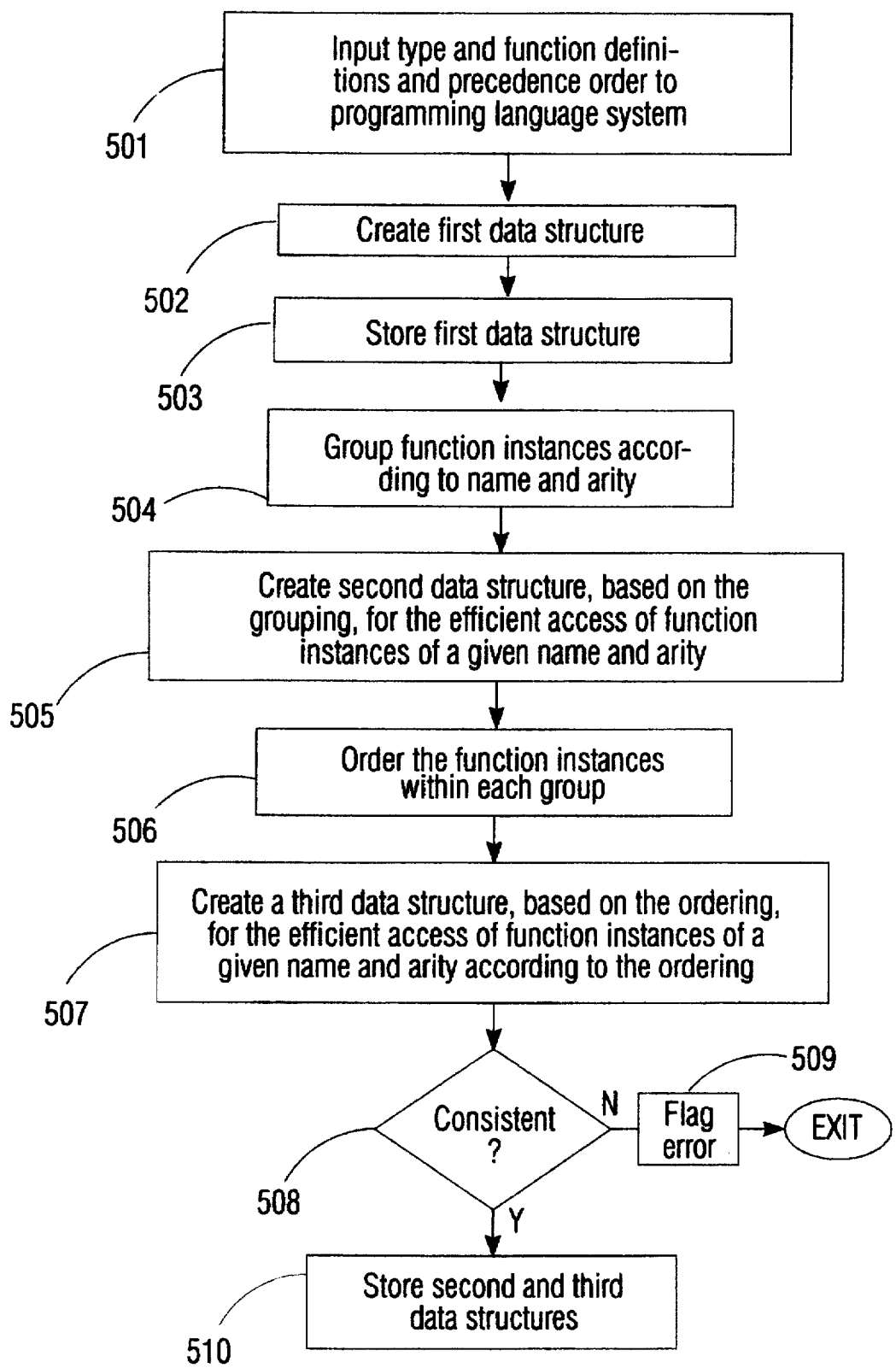
FIGS. 5 and 6 are flowchart representations of the method steps called for in one embodiment of the invention to realize the objects set forth hereinbefore.
Figure 6:
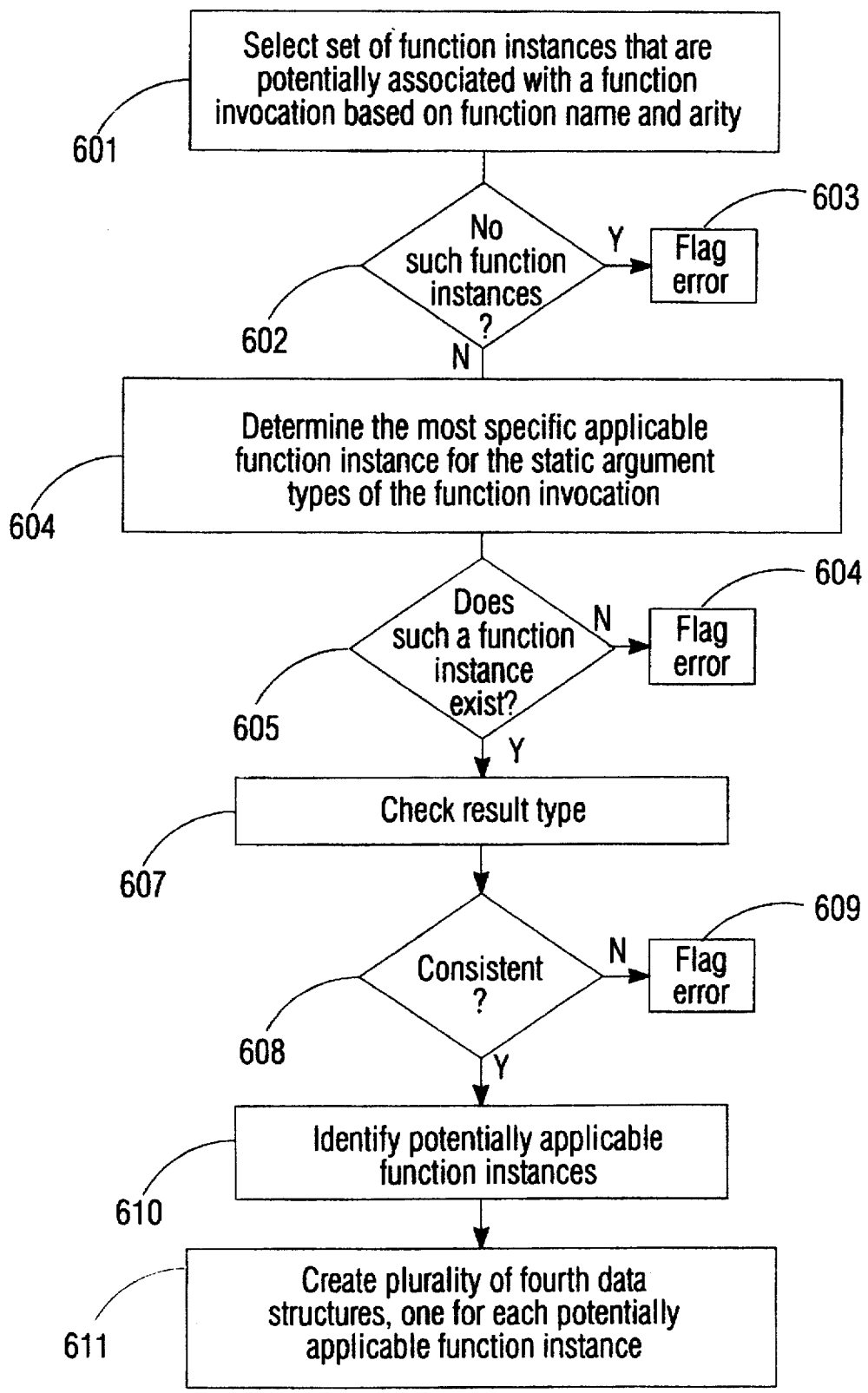

With reference to FIG. 5, it can be seen that, in accordance with the invention, the first part of the "preparation process" takes the three inputs shown in step 501 (the type and function definitions, and a predefined precedence order), creates the first data structure referred to above (step 502), and stores the first data structure (step 503).

The processing sequence represented by steps 501, 502, and 503 correspond with steps (a)–(b) of the aforesaid preparation process. These steps may, as indicated hereinbefore, be implemented by prior art techniques for describing type hierarchy.

Ultimately, the determination of which function instances are applicable to a function invocation, and the selection of a specific function instance to invoke at run time, depends on testing whether one type is a subtype of another. The determination of whether function instances are confusable depends on testing whether a pair of types has a common subtype.

In order to efficiently make these determinations, in accordance with the invention the preparation process draws efficiency from a materialization of the transitive closure of the subtype relationship. While this provides advantageous efficiency, other mechanisms may also be used.

The "compressed transitive closure" technique taught by Agrawal, Borgida, and Jagadish in an article entitled "Efficient Management of Transitive Relationships in Large Data and Knowledge Bases", appearing in the Proceedings of ACM SIGMOD 89 (1989), as well as other prior art techniques for representing a transitive closure, can be employed to create the first data structure referred to at step 502 in FIG. 5. This article will be referred to as "Agrawal," and is hereby incorporated by reference.

Using the Agrawal technique, an index and a set of ranges are associated with each type. If the index of one type falls into the range of another type, then the first type is a subtype of the second type. Furthermore, if the ranges associated with two types overlap, then the two types have common subtypes in the overlapping range. Using the technique taught in Agrawal leads to logarithmic time to locate types (determine their index and ranges) and, essentially, constant time to test subtype relationships.

Next, with reference to steps 504–510 of FIG. 5, steps (c)–(f) of the preparation process will be explained in detail. First, a process partitioning function instances according to name and arity is described, followed by a description of techniques for the ordering of the function instances of a given name and arity.

Given a set of function instances, one can partition, or group, the function instances into sets of overloaded functions (step 504). All function instances with the same function name and argument arity fall into the same set of overloaded function instances. Then, a second data structure is created (step 505), to reflect the grouping.

In order to facilitate the access to the set of functions of a given name and arity, an ordered (multi-field) associative index associated with the function name and arity may also be created and employed. An "ASSOCIATIVE INDEX" is a data structure to allow the ordered associative access to functions of a given name and arity. The above-discussed second data structure preferably includes such an associative index data structure. This may include data structures, implementation techniques, or mechanisms of the type generally referred to as an "index" in file-system or database terminology, and may also include a B-tree, hash table, etc.

In order to test for function instance consistency and to facilitate calculation of the most specific applicable function instance of a function invocation, the functions within a set of function instances of a given name and arity are ordered, prior to processing function invocations. This ordering corresponds with step (d) of the preparation process, described above, and is shown taking place in step 506 of FIG. 5.

However, the ordering may not be a total order, due to the fact that not every pair of function instances of a given name and arity is necessarily itself confusable.

In addition, if Inheritance Order Precedence is used to define function instance specificity, not all confusable functions can be ordered independent of the function invocation. Therefore, in that case, function instances may have "equal" precedence. In this regard, it should be noted that whenever Inheritance Order Precedence is used, the function instances which cannot be statically ordered (i.e., those whose precedence order depends on the actual argument types) are grouped together in the ordering of the set of function instances of the same name and arity. The members of such a group of function instances which are potentially applicable to a function invocation must be processed specially when selecting the function instance at run time.

The partial order of the function instances within the different sets of function instances can be extended to a total order for all function instances by a topological sort. A compare function is presented below, which determines the Global Type Precedence between two confusable function instances. This pseudocode fragment may be used to implement the function shown at step 506 of FIG. 5, which corresponds with step (d) of the aforesaid preparation process. It should be recalled from the Glossary, above, that Global Type Precedence defines a partial order based on argument type, such that if A<B, then A precedes B; and if C is a subtype of D and E, then either D precedes E or E precedes D.

---

Order($f_1$, $f_2$) returns Specificity
Specificity ← Equal
do ∀i 1 ≤ i ≤ $f_1$.arity while Specificity = Equal
  if $f_1$.ArgType[i] ≠ $f_2$.ArgType[i]
    if $f_1$.ArgType[i] precedes $f_2$.ArgType[i]
      Specificity ← Greater
    else
      Specificity ← Less

---

In step 507, a third data structure is created, based on the ordering. An ordered (multi-field) associative index associated with the function name, arity, and formal argument types may be created and employed as part of the third data structure. This third data structure facilitates the access to the ordered set of functions of a given name and arity in addition to, or as an alternative to, the index data structure described above (that is, the second data structure).

By contrast, the previously discussed associative index was merely associated with the function name and arity. This latter index, rather, is a data structure to allow the ordered associative access to functions of a given name and arity in the function precedence order induced by the function precedence rule and the function argument types.

The above-discussed third data structure preferably includes such an associative index data structure. This may include data structures, implementation techniques, or mechanisms of the type generally referred to as an "index" in file-system or database terminology, and may also include a B-tree, hash table, etc.

Let a numeric value be associated with every type T, and denoted as Index(T), and such that, if a type A is a proper subtype of a type B, then Index(A)<Index(B), then the precedence order of function instances can be encoded in the associative index of the third data structure as the name and arity and the concatenation of the indexes of the function instances' argument types. Searching the third data structure in ascending numerical order, starting with the given name and arity and any value for the argument Index values that is numerically no greater than that of the concatenation of the Index values of the types of the arguments of the function invocation will locate the most specific applicable function instance (if it exists). If the function instance precedence rule is one of those described, other than inheritance order precedence, then the first function instance that is applicable to the invocation will be the most specific applicable function instance for the invocation. Otherwise, groups of function instances with equal static precedence must be processed specially, as discussed shortly.

Alternatively, if the assignment of Index values to types is such that, if a type A is a proper subtype of a type B, then Index B<Index A, then the associative index of the third data structure should be searched in descending numerical order, starting with the given name and arity and any value for the argument Index values that is numerically no less than that of the concatenation of the Index values of the types of the arguments of the function invocation.

Next, testing for consistency of confusable function instances will be described. First, it should be recalled that consistency between function instances is required in order to ensure that (1) function instances are distinguishable, and (2) the result type of any function instance which may be called by some function invocation execution is consistent with the invocation context.

The following pseudocode fragment may be used to implement the function shown at step 508 of FIG. 5, which corresponds with step (e) of the aforesaid preparation process. This pseudocode fragment checks that the members of a set of function instances of a given name and arity (Fun Set) are distinguishable, and that the result types of the function instances conform to their precedence order.

```
CheckConsistency(Fun Set) returns Consistent
  Consistent ← True
  do ∀f1, f2 ∈ Fun Set, f1≠f2 while Consistent
    if ∀n, 1≤n≤f1.arity, ∃ Tn≤f1.ArgType[n]^Tn≤f2.ArgType[n]
      -- f1 and f2 are confusable
      if ∃ i, 1≤i≤f1.arity, f1.ArgType[i] ≠ f2.ArgType[i]
        -- f1 and f2 are indistinguishable
        Consistent ← False
      else
        -- check result type conformance
        Specificity ← Order(f1, f2)
        if Specificity = Greater f1.resType ≤ f2.ResType
          Consistent ← False
        else if Specificity = Less f2.ResType ≤ f1.ResType
          Consistent ← False
        else if f1.ResType ≠ f2.ResType
          Consistent ← False
```

FIG. 5 includes step 509, which indicates that an error flag should be set if the above-described consistency test fails, and step 510, corresponding to step (f) of the aforesaid preparation process, which indicates that the data structures for the ordered function instances for each set of function instances of a given name and arity be stored.

Given a function invocation $fcn(T^1, T^2, \ldots, T^n)$, one must determine, at compile time, that the invocation is legal (i.e., there exists at least one applicable function instance), and that all potentially applicable function instances return a result type consistent with the context of the invocation. This is determined by steps 601, 602, and 603 of FIG. 6.

Initially, step 601 selects the appropriate set of function instances, created by the grouping step 504, having the correct function name and arity corresponding with that of the function invocation. The absence of any such set, or of any such function instances, are illegal conditions. Such illegal conditions are detected and flagged, via steps 602 and 603 of FIG. 6.

The aforestated second condition is satisfied if the result type of the most specific applicable function instance is consistent with the context of the invocation, and follows from the definition of function instance consistency and function instance precedence as set forth hereinbefore.

The associative index on function name and arity (the second data structure) can be employed to efficiently locate the set of function instances that "match" a function invocation in name and arity. First, sets of function instances of the same name and arity as the invocation are identified. Then, the compile-time processing of a function invocation must find the most specific applicable function instance (step 604 of FIG. 6).

If the sets of function instances of each name and arity are each totally ordered by function instance precedence rules from most specific to least specific, they can be searched in that order. Such searching preferably uses the associative index on function name, arity and argument types created for that purpose (the third data structure), to find the first function instance that may be applicable to the invocation in question.

Note that any partial order established by the precedence rules can be extended to a total order by using a topological sort.

Note also that, if the partial order over the types is such that, if a type A is a subtype of a type B, then Index(A) is numerically less than Index (B), then this associative index should be searchable in ascending numerical order. If the partial order over the types is such that, if a type A is a subtype of a type B, then Index(A) is numerically greater than Index (B), then this associative index should be searchable in descending numerical order.

If global type precedence is used, if argument subtype precedence is used, if there is only single inheritance, or if the argument types have no subtypes, then the first applicable function instance that is found by searching the associative index in this manner for the invocation will be the most specific applicable function instance.

If inheritance order precedence is used, then it is necessary to pairwise compare the applicable function instances, to determine the most specific applicable function instance.

In any event, the most specific applicable function instance and its result type must be consistent with the context of the function invocation. A check is made for this required consistency, as shown in steps 604 through 609 of FIG. 6. These steps correspond with steps (2) and (3) of the aforestated process performed by the type-checking module 102.

In addition to validating a function invocation by finding an applicable function instance and checking the conformance of the result type, the search for an applicable function instance can also collect all the function instances which are potentially applicable to the invocation. These function instances precede the most specific applicable function instance in the search order of the third data structure. They are confusable with the function invocation. They can be identified by searching in the opposite order of the search by which the most specific applicable function instance was found, by starting the search with the first function instance of the given name and arity in the same search order by which the most specific applicable function instance was found.

Alternatively, the potentially applicable function instances can be located, while searching for the most specific applicable function instance, by beginning the search for the most specific applicable function instance with the first function instance of the given name and arity in the search order.

The following pseudocode fragment illustrates the accumulation of the (ordered) set of potentially applicable function instances given a set of function instances of a given name and arity, ordered by function instance precedence. This code may be used to implement steps (4)–(5) of the aforestated process performed by type-checking module 102, corresponding to the functions taking place at blocks 610 and 611 of FIG. 6.

As discussed above, a respective fourth data structure is created for each respective one of the function instances found to be potentially applicable. If there are no applicable function instances, the count of potentially applicable functions is set to zero.

```
FindAppl(FS,Invocation) returns <PotAppl[ ],Count>
  Count ← 0
  foundAppl ← False
  do ∀fcn ∈ FS in precedence order while ¬foundAppl
    -- if fcn is confusable with Invocation
    if ∀n, 1 ≤ n ≤ Invocation.arity, ∃Tn, Tn ≤ Invocation.ArgType[n]^
       Tn ≤ fcn.ArgType[n]
      Count ← Count + 1
      PotAppl[Count] ← fcn
    -- if fcn is applicable to Invocation
    if ∀n, 1 ≤ n ≤ Invocation.arity, Invocation.ArgType[n] ≤
       fcn.ArgType[n]
``` foundAppl ← True
if ¬foundAppl
Count ← 0

Finally, a process for selecting the function instance to be executed is set forth hereinafter.

The potentially applicable function instances (PotAppl) derived in the previous step during program compilation are used during program execution to select the function instance to be executed. These potentially applicable function instances were preferably provided by the method shown in FIG. 6, via the plurality of fourth data structures.

However, instead of using the static argument types of the function invocation, the types of the actual arguments of the invocation are used to select the most specific applicable function instance. It is the most specific function instance of the potentially applicable function instances, relative to the actual argument types, that is called and executed at run time.

The following pseudocode fragment illustrates the selection of the function instance to be executed. This pseudocode assumes that some "global" precedence order is used and, therefore, the first applicable function instance encountered is the function instance to be executed.

```
Dispatch(PotAppl,Invocation) returns fcn
  fcn ← 0
  do ∀i 1 ≤ i ≤ maxfcns while fcn = 0
    -- if next PotAppl is applicable
    if ∀n, 1 ≤ n ≤ Invocation.arity, Invocation.ActArgType[n] ≤
      PotAppl[i].ArgType[n]
      fcn ← PotAppl[i]
```

If Inheritance Order Precedence is used, groups of function instances with equal static precedence must be processed specially. It should be noted that equal static precedence occurs when the formal argument types at the first differing argument position are not in a subtype relationship. The function precedence, in that case, depends on the (user defined) inheritance order of the actual argument type.

If the first applicable function instance of the ordered set of potentially applicable function instances is followed by one or more potentially applicable function instances of equal static precedence, then the search for the most specific applicable function instance must continue. The following pseudocode indicates how the search continues to select the most specific of the group of function instances with statically equal precedence.

```
DispatchIOP(PotAppl,Invocation) returns fcn
  fcn ← 0
  do ∀i, 1 ≤ i ≤ maxfcns while fcn = 0
    -- if next PotAppl is applicable
    if ∀n, 1 ≤ n ≤ Invocation.arity, Invocation.ActArgType[n]≤
      PotAppl[i].ArgType[n]
      fcn ← PotAppl[i]
    -- search 'equal' specificity group for better match
    do ∀k, i+1 ≤ k ≤ maxfcns while Order(fcn,PotAppl[k]) = Equal
      if ∀n 1 ≤ n ≤ Invocation.arity, Invocation.ActArgType[n]≤
        PotAppl[k].ArgType[n]
        -- PotAppl[k] is applicable and of Equal specificity
        -- check if PotAppl[k] more specific than fcn with respect to
          invocation
        Done ← False
        do ∀j, 1 ≤ j ≤ Invocation.arity while ¬Done
          if fcn.ArgType[j] ≠ PotAppl[k].ArgType[j]
            -- found 1st differing argument position
```

```
            Done ← True
            if Invocation.ActArgType[j] inherits PotAppl[k].ArgType[j] before
              fcn.ArgType[j]fcn.ArgType[j]
              -- PotAppl[k] more specific with respect to Invocation
              fcn ← PotAppl[k]
```

It should be noted that there are a number of optimizations and extensions of the above-described methods contemplated by the invention.

One additional consideration has to do with making a determination, between two or more function instances having statistically equal precedence, as to which function instance is to be selected. (Statistically equal precedence preferably means having the same name, arity, and formal argument types.) This is, in essence, the issue of "tie-breaking".

Suppose there are two function instances of the same name, arity, and formal argument types, to one of which a function invocation is to be assigned. If these two function instances belong to two different schemas, that is, they are distinguishable by a hierarchical naming mechanism in which the higher-order names can be defaulted at the point of invocation, then the different schemas could form a basis for making a tie-breaking decision. For instance, the system could include a path which designates an ordered list of schemas. The schemas of the two function instances would then appear in the path in two different positions in the path. Since the ordered list treats one of the schemas as being before the other schema in the path, the function instance corresponding with the first occurring schema would be selected.

Another optimization is that, if the partial order over types induced by the subtype relationship is extended to a total order, then each type can be assigned an index, such that, if $T1<T2$, then $Index(T1)<Index(T2)$. Given these type indexes, each function instance can be assigned an index equal to the maximum of the type indexes of its arguments, and each function invocation can be assigned an index equal to the minimum of the type indexes of its (static or actual) arguments. If the index of a function instance is less than the index of a function invocation, then the instance is not applicable to the invocation.

The order in which argument positions are checked for applicability during the search for the most specific applicable function (during compilation or execution) can be optimized to first test the positions most likely to disqualify the function instance or to disqualify the most function instances. In the first case, argument positions whose formal types differ for adjacent function instances in the function precedence order should be checked earlier. Checking argument positions whose formal types are the same for adjacent functions can eliminate more than one function at once. Decision table optimization techniques can also be applied to optimize the type comparisons when testing for applicability of function instances.

The consistency rules between confusable functions (i.e, result types must conform to function precedence order) can be relaxed. For example, instead of statically ensuring that more specific function instances have more specific result types, the compatibility of the function instance result type with the expected result type can be made part of the criteria for function instance applicability. This and other restrictions on applicability can be applied at compile and run time to extend the semantics of function instance selection.

What has been described in detail hereinabove are methods and apparatus meeting all of the aforestated objectives.

As previously indicated, those skilled in the art will recognize that the foregoing description has been presented for the sake of illustration and description only. It is not intended to be exhaustive or to limit the invention to the precise form disclosed, and obviously many modifications and variations are possible in light of the above teaching.

For example, systems which support incremental type and function instance definitions and accordingly allow for modification of the outputs of the aforementioned preparation process, are systems in which it is contemplated that the invention may be utilized.

The embodiments and examples set forth herein were presented in order to best explain the principles of the instant invention and its practical application to thereby enable others skilled in the art to best utilize the instant invention in various embodiments and with various modifications as are suited to the particular use contemplated.

What is claimed is:

1. For use with a programming language system, a method for assigning a function invocation within a body of source code, the function invocation having a given name, arity, and argument types, to a function instance from among a plurality of function instances, each of the plurality of function instances having a name and arity which match the name and arity of the function invocation, the function instance to which the function invocation is assigned being the most specific applicable function instance for all of the argument types which match the argument types of the function invocation as determined by a function instance precedence rule for ordering function instances according to all argument types (multimethod function selection), for execution of the function instance to which the function invocation is assigned, the method comprising the steps of:

classifying the plurality of function instances according to name and arity into categories, the categories including a first category having a name and arity which match the given name and arity of the function invocation, the first category including a plurality of first ones of the function instances; and determining a function instance precedence ordering for the first function instances in the first category, by using a precedence rule for ordering function instances according to all argument types (multimethod function selection);

whereby, when the body of source code is compiled, the precedence rule and the precedence ordering are exploited to select, from the first category, those of the first function instances that may be applicable to all of the run-time argument types of the function invocation, and whereby, when the function invocation is executed, the function invocation is assigned to one of the first function instances, selected at compile time, all of whose argument types most closely match the actual run-time argument types according to the precedence rule for ordering function instances according to all argument types (multimethod function selection).

2. A method as recited in claim 1, wherein the steps of classifying and determining take place prior to compile time.

3. A method as recited in claim 1, wherein the steps of classifying and determining take place at compile time.

4. A method as recited in claim 1, wherein the steps of classifying and determining take place at run time.

5. A method as recited in claim 1, wherein:
at least some of the types have subtypes;
the programming language system supports a plurality of respective data types and includes respective type definitions for the respective data types, each respective type definition possibly including a subtype specification which defines any subtype relationships between the respective data type and other data types;
the first function instances have respective sets of arguments, and the arguments of the respective sets have given data types; and
the step of determining includes generating subtype relationships from the type definitions;
whereby, where an argument of a given function instance in the first category has a given type, the given type having a given set of subtypes, any one of the subtypes can be substituted for the given type.

6. A method as recited in claim 5, wherein the step of determining a function instance precedence ordering includes using a precedence rule which is based on the subtype relationships of the respective types of all of the arguments of each respective function instance in the first category.

7. A method as recited in claim 1, wherein:
for each function instance, the arguments are in a sequence of positions; and
the step of determining a function instance precedence ordering includes using a precedence rule which is based on respective positions of all of the arguments, within the respective function instances, of their respective argument types.

8. A method as recited in claim 5, further comprising the step of creating a first data structure which includes a representation of the subtype relationships.

9. A method as recited in claim 1, further comprising the step of creating a second data structure which includes a representation of the classification of the first function instances by function name and arity.

10. A method as recited in claim 6, further comprising the step of creating a third data structure which includes a representation of the ordering of the first function instances as determined by a function instance precedence rule for ordering function instances according to all argument types (multimethod function selection) within the first category, as provided by the precedence rule for ordering function instances according to all argument types (multimethod function selection).

11. A method as recited in claim 6, further comprising the step of creating a data structure which includes (i) a representation of the classification of the first function instances by function name and arity, and (ii) a representation of the ordering of the first function instances within the first category, as provided by the precedence rule for ordering function instances according to all argument types (multimethod function selection).

12. A method as recited in claim 1, further comprising the steps of:
selecting one of the categories of function instances from among the plurality of function instances;
measuring a specificity with which each of the function instances within the selected category applies to the function invocation, the specificity being determined by the precedence rule for ordering function instances according to all argument types (multimethod function selection); and
selecting a most specific one of the function instances within the selected one of the categories as being most specifically applicable to the function invocation as determined by a function instance precedence rule for ordering function instances according to all argument types (multimethod function selection).

13. A method as recited in claim 12, wherein the step of selecting a most specific one of the function instances includes determining, for each of the function instances within the selected category, whether all of the argument types of the arguments of the function invocation are subtypes of the argument types of the arguments of the function instance.

14. A method as recited in claim 12, wherein the step of selecting one of the categories of function instances includes exploiting the classification of function instances according to name and arity, as provided in the second data structure, to limit the number of categories of function instances examined to select one of the categories of function instances from among the plurality of function instances.

15. A method as recited in claim 12, wherein the step of selecting a most specific one of the function instances includes exploiting the precedence ordering encoded in the third data structure to limit the number of function instances examined to select a most specific one of the function instances.

16. A method as recited in claim 1, further comprising the step of selecting a subset of the function instances of the first category which are applicable when arguments of types that are subtypes of the types of the respective arguments of the function invocation are substituted for the respective arguments of the function invocation.

17. A method as recited in claim 16, wherein the step of selecting includes exploiting the function precedence ordering for ordering function instances according to all argument types (multimethod function selection) encoded in the third data structure to restrict the search for function instances of the selected category which are applicable when arguments of argument types that are subtypes of the respective argument types of the function invocation are substituted for the respective arguments of the function invocation, to those function instances which are no less specific than the selected most specific one of the function instances.

18. A method as recited in claim 16, further comprising the step of creating a fourth data structure, which is specific to the function invocation, and which comprises the subset of function instances selected by the step of selecting a subset of the function instances.

19. A method as recited in claim 18, further comprising the step of selecting, from the subset of function instances, and based on (i) the fourth data structure and (ii) the types of all of the actual arguments of the function invocation at run time, the most specific applicable function instance, to be invoked for the types of all of the actual arguments of the invocation as determined by a function instance precedence rule for ordering function instances according to all argument types (multimethod function selection).

20. A programming language system for assigning a function invocation within a body of source code, the function invocation having a given name, arity, and argument types, to a function instance from among a plurality of function instances, each of the plurality of function instances having a name and arity which match the name and arity of the function invocation, the function instance to which the function invocation is assigned being the most specific applicable function instance for all of the argument types which match the argument types of the function invocation as determined by a function instance precedence rule for ordering function instances according to all argument types (multimethod function selection), for execution of the function instance to which the function invocation is assigned, the system comprising:

means for classifying the plurality of function instances according to name and arity into categories, the categories including a first category having a name and arity which match the given name and arity of the function invocation, the first category including a plurality of first ones of the function instances; and means for determining a function instance precedence ordering for the first function instances in the first category, by using a precedence rule for ordering function instances according to all argument types (multimethod function selection);

whereby, when the body of source code is compiled, the precedence rule and the precedence ordering are exploited to select, from the first category, those of the first function instances that may be applicable to all of the run-time argument types of the function invocation, and whereby, when the function invocation is executed, the function invocation is assigned to one of the first function instances, selected at compile time, all of whose argument types most closely match the actual run-time argument types according to the precedence rule for ordering function instances according to all argument types (multimethod function selection).

21. A system as recited in claim 20, wherein the means for classifying and the means for determining are operable prior to compile time.

22. A system as recited in claim 20, wherein the means for classifying and the means for determining are operable at compile time.

23. A system as recited in claim 20, wherein the means for classifying and the means for determining are operable at run time.

24. A system as recited in claim 20, wherein:

at least some of the types have subtypes;

the programming language system supports a plurality of respective data types and includes respective type definitions for the respective data types, each respective type definition possibly including a subtype specification which defines any subtype relationships between the respective data type and other data types;

the first function instances have respective sets of arguments, and the arguments of the respective sets have given data types; and the means for determining includes means for generating subtype relationships from the type definitions;

whereby, where an argument of a given function instance in the first category has a given type, the given type having a given set of subtypes, any one of the subtypes can be substituted for the given type.

25. A system as recited in claim 24, wherein the means for determining a function instance precedence ordering includes means for using a precedence rule which is based on the subtype relationships of the respective types of all of the arguments of each respective function instance in the first category.

26. A system as recited in claim 20, wherein:

for each function instance, the arguments are in a sequence of positions; and the means for determining a function instance precedence ordering includes means for using a precedence rule which is based on respective positions of all of the arguments, within the respective function instances, of their respective argument types.

27. A system as recited in claim 24, further comprising means for creating a first data structure which includes a representation of the subtype relationships.

28. A system as recited in claim 20, further comprising means for creating a second data structure which includes a representation of the classification of the first function instances by function name and arity.

29. A system as recited in claim 25, further comprising means for creating a third data structure which includes a representation of the ordering of the first function instances as determined by a function instance precedence rule for ordering function instances according to all argument types (multimethod function selection) within the first category, as provided by the precedence rule for ordering function instances according to all argument types (multimethod function selection).

30. A system as recited in claim 25, further comprising means for creating a data structure which includes (i) a representation of the classification of the first function instances by function name and arity, and (ii) a representation of the ordering of the first function instances within the first category, as provided by the precedence rule for ordering function instances according to all argument types (multimethod function selection).

31. A system as recited in claim 20, further comprising:
means for selecting one of the categories of function instances from among the plurality of function instances;
means for measuring a specificity with which each of the function instances within the selected category applies to the function invocation, the specificity being determined by the precedence rule for ordering function instances according to all argument types (multimethod function selection); and
means for selecting a most specific one of the function instances within the selected one of the categories as being most specifically applicable to the function invocation as determined by a function instance precedence rule for ordering function instances according to all argument types (multimethod function selection).

32. A system as recited in claim 31, wherein the means for selecting a most specific one of the function instances includes means for determining, for each of the function instances within the selected category, whether all of the argument types of the arguments of the function invocation are subtypes of the argument types of the arguments of the function instance.

33. A system as recited in claim 31, wherein the means for selecting one of the categories of function instances includes means for exploiting the classification of function instances according to name and arity, as provided in the second data structure, to limit the number of categories of function instances examined to select one of the categories of function instances from among the plurality of function instances.

34. A system as recited in claim 31, wherein the means for selecting a most specific one of the function instances includes means for exploiting the precedence ordering encoded in the third data structure to limit the number of function instances examined to select a most specific one of the function instances.

35. A system as recited in claim 20, further comprising means for selecting a subset of the function instances of the first category which are applicable when arguments of types that are subtypes of the types of the respective arguments of the function invocation are substituted for the respective arguments of the function invocation.

36. A system as recited in claim 35, wherein the means for selecting includes means for exploiting the function precedence ordering for ordering function instances according to all argument types (multimethod function selection) encoded in the third data structure to restrict the search for function instances of the selected category which are applicable when arguments of argument types that are subtypes of the respective argument types of the function invocation are substituted for the respective arguments of the function invocation, to those function instances which are no less specific than the selected most specific one of the function instances.

37. A system as recited in claim 35, further comprising means for creating a fourth data structure, which is specific to the function invocation, and which comprises the subset of function instances selected by the means for selecting a subset of the function instances.

38. A system as recited in claim 37, further comprising means for selecting, from the subset of function instances, and based on (i) the fourth data structure and (ii) the types of all of the actual arguments of the function invocation at run time, the most specific applicable function instance, to be invoked for the types of all of the actual arguments of the invocation as determined by a function instance precedence rule for ordering function instances according to all argument types (multimethod function selection).

39. A computer program product for use with a programming language system, for assigning a function invocation within a body of source code, the function invocation having a given name, arity, and argument types, to a function instance from among a plurality of function instances, each of the plurality of function instances having a name and arity which match the name and arity of the function invocation, the function instance to which the function invocation is assigned being the most specific applicable function instance for all of the argument types which match the argument types of the function invocation as determined by a function instance precedence rule for ordering function instances according to all argument types (multimethod function selection), for execution of the function instance to which the function invocation is assigned, the computer program product comprising:
a computer-readable recording medium;
means, recorded on the recording medium, for directing the programming language system to classify the plurality of function instances according to name and arity into categories, the categories including a first category having a name and arity which match the given name and arity of the function invocation, the first category including a plurality of first ones of the function instances; and
means, recorded on the recording medium, for directing the programming language system to determine a function instance precedence ordering for the first function instances in the first category, by using a precedence rule for ordering function instances according to all argument types (multimethod function selection);
whereby, when the body of source code is compiled, the precedence rule and the precedence ordering are exploited to select, from the first category, those of the first function instances that may be applicable to all of the run-time argument types of the function invocation, and
whereby, when the function invocation is executed, the function invocation is assigned to one of the first function instances, selected at compile time, all of whose argument types most closely match the actual run-time argument types according to the precedence rule for ordering function instances according to all argument types (multimethod function selection).

40. A computer program product as recited in claim 39, wherein the means for directing to classify and the means for directing to determine are operable prior to compile time.

41. A computer program product as recited in claim 39, wherein the means for directing to classify and the means for directing to determine are operable at compile time.

42. A computer program product as recited in claim 39, wherein the means for directing to classify and the means for directing to determine are operable at run time.

43. A computer program product as recited in claim 39, wherein:

at least some of the types have subtypes;

the programming language system supports a plurality of respective data types and includes respective type definitions for the respective data types, each respective type definition possibly including a subtype specification which defines any subtype relationships between the respective data type and other data types;

the first function instances have respective sets of arguments, and the arguments of the respective sets have given data types; and the means for directing to determine includes means, recorded on the recording medium, for directing the programming language system to generate subtype relationships from the type definitions;

whereby, where an argument of a given function instance in the first category has a given type, the given type having a given set of subtypes, any one of the subtypes can be substituted for the given type.

44. A computer program product as recited in claim 43, wherein the means for directing to determine a function instance precedence ordering includes means, recorded on the recording medium, for directing the programming language system to use a precedence rule which is based on the subtype relationships of the respective types of all of the arguments of each respective function instance in the first category.

45. A computer program product as recited in claim 39, wherein:

for each function instance, the arguments are in a sequence of positions; and the means for directing to determine a function instance precedence ordering includes means, recorded on the recording medium, for directing the programming language system to use a precedence rule which is based on respective positions of all of the arguments, within the respective function instances, of their respective argument types.

46. A computer program product as recited in claim 43, further comprising means, recorded on the recording medium, for directing the programming language system to create a first data structure which includes a representation of the subtype relationships.

47. A computer program product as recited in claim 39, further comprising means, recorded on the recording medium, for directing the programming language system to create a second data structure which includes a representation of the classification of the first function instances by function name and arity.

48. A computer program product as recited in claim 44, further comprising means, recorded on the recording medium, for directing the programming language system to create a third data structure which includes a representation of the ordering of the first function instances as determined by a function instance precedence rule for ordering function instances according to all argument types (multimethod function selection) within the first category, as provided by the precedence rule for ordering function instances according to all argument types (multimethod function selection).

49. A computer program product as recited in claim 44, further comprising means, recorded on the recording medium, for directing the programming language system to create a data structure which includes (i) a representation of the classification of the first function instances by function name and arity, and (ii) a representation of the ordering of the first function instances within the first category, as provided by the precedence rule for ordering function instances according to all argument types (multimethod function selection).

50. A computer program product as recited in claim 39, further comprising:

means, recorded on the recording medium, for directing the programming language system to select one of the categories of function instances from among the plurality of function instances;

means, recorded on the recording medium, for directing the programming language system to measure a specificity with which each of the function instances within the selected category applies to the function invocation, the specificity being determined by the precedence rule for ordering function instances according to all argument types (multimethod function selection); and means, recorded on the recording medium, for directing the programming language system to select a most specific one of the function instances within the selected one of the categories as being most specifically applicable to the function invocation as determined by a function instance precedence rule for ordering function instances according to all argument types (multimethod function selection).

51. A computer program product as recited in claim 50, wherein the means for directing to select a most specific one of the function instances includes means, recorded on the recording medium, for directing the programming language system to determine, for each of the function instances within the selected category, whether all of the argument types of the arguments of the function invocation are subtypes of the argument types of the arguments of the function instance.

52. A computer program product as recited in claim 50, wherein the means for directing to select one of the categories of function instances includes means, recorded on the recording medium, for directing the programming language system to exploit the classification of function instances according to name and arity, as provided in the second data structure, to limit the number of categories of function instances examined to select one of the categories of function instances from among the plurality of function instances.

53. A computer program product as recited in claim 50, wherein the means for directing to select a most specific one of the function instances includes means, recorded on the recording medium, for directing the programming language system to exploit the precedence ordering encoded in the third data structure to limit the number of function instances examined to select a most specific one of the function instances.

54. A computer program product as recited in claim 39, further comprising means, recorded on the recording medium, for directing the programming language system to select a subset of the function instances of the first category which are applicable when arguments of types that are subtypes of the types of the respective arguments of the function invocation are substituted for the respective arguments of the function invocation.

55. A computer program product as recited in claim 54, wherein the means for directing to select includes means, recorded on the recording medium, for directing the programming language system to exploit the function precedence ordering for ordering function instances according to all argument types (multimethod function selection) encoded in the third data structure to restrict the search for function instances of the selected category which are applicable when arguments of argument types that are subtypes of the respective argument types of the function invocation are substituted for the respective arguments of the function invocation, to those function instances which are no less specific than the selected most specific one of the function instances.

56. A computer program product as recited in claim 54, further comprising means, recorded on the recording medium, for directing the programming language system to create a fourth data structure, which is specific to the function invocation, and which comprises the subset of function instances selected by means for directing to select a subset of the function instances.

57. A computer program product as recited in claim 56, further comprising means, recorded on the recording medium, for directing the programming language system to select, from the subset of function instances, and based on (i) the fourth data structure and (ii) the types of all of the actual arguments of the function invocation at run time, the most specific applicable function instance, to be invoked for the types of all of the actual arguments of the invocation as determined by a function instance precedence rule for ordering function instances according to all argument types (multimethod function selection).

* * * * *